(12) United States Patent
Saijo

(10) Patent No.: US 12,180,754 B2
(45) Date of Patent: Dec. 31, 2024

(54) DOOR OPENER FOR VEHICLE

(71) Applicant: ALPS ALPINE CO., LTD., Tokyo (JP)

(72) Inventor: Takayuki Saijo, Miyagi (JP)

(73) Assignee: ALPS ALPINE CO., LTD., Tokyo (JP)

( * ) Notice: Subject to any disclaimer, the term of this patent is extended or adjusted under 35 U.S.C. 154(b) by 247 days.

(21) Appl. No.: 17/821,532

(22) Filed: Aug. 23, 2022

(65) Prior Publication Data

US 2022/0396979 A1    Dec. 15, 2022

Related U.S. Application Data

(63) Continuation of application No. PCT/JP2021/007518, filed on Feb. 26, 2021.

(30) Foreign Application Priority Data

Mar. 13, 2020 (JP) .................. 2020-044264

(51) Int. Cl.
*E05B 77/22* (2014.01)
*E05B 79/22* (2014.01)
(Continued)

(52) U.S. Cl.
CPC .............. *E05B 81/56* (2013.01); *E05B 79/22* (2013.01); *E05B 81/76* (2013.01); *E05B 85/103* (2013.01)

(58) Field of Classification Search
CPC ...... E05B 85/10; E05B 85/103; E05B 85/107; E05B 81/56; E05B 81/76; E05B 79/22;
(Continued)

(56) References Cited

U.S. PATENT DOCUMENTS 1,383,582 A * 7/1921 Stubbs ...................... E05F 7/04
  292/73
2,208,818 A * 7/1940 Schaffler ............... E05B 85/107
  292/DIG. 31
(Continued)

FOREIGN PATENT DOCUMENTS

DE     19921440 A1 * 11/2000 ............. E05B 85/10
DE     10008515 A1 *  8/2001 ............. E05B 81/76
(Continued)

OTHER PUBLICATIONS

International Search Report for PCT/JP2021/007518 mailed on Apr. 27, 2021.

*Primary Examiner* — Carlos Lugo
(74) *Attorney, Agent, or Firm* — IPUSA, PLLC

(57) ABSTRACT

A door opener for a vehicle includes a housing; an operation lever attached to the housing such as to be rotatable around a rotation shaft between an initial position and a terminal position; a first switch configured to generate a control signal; a connector connected to a second switch that mechanically opens a door of a vehicle; a tactile sensation generating mechanism; and an elastic body that returns the operation lever. The first and second switch are turned off when a rotation angle of the operation lever is in a first angle range. When the rotation angle is in a second angle range, the first switch is turned on, a tactile sensation is generated by the tactile sensation generating mechanism, and the second switch remains turned off. When the rotation angle is in a third angle range, the second switch is turned on.

13 Claims, 15 Drawing Sheets

(51) Int. Cl.
*E05B 81/56* (2014.01)
*E05B 81/76* (2014.01)
E05B 85/10 (2014.01)
E05B 85/12 (2014.01)

(58) Field of Classification Search
CPC ..... E05B 2015/0403; E05B 2015/0455; E05B 15/04
See application file for complete search history.

(56) References Cited

U.S. PATENT DOCUMENTS

| | | | | |
|---|---|---|---|---|
| 3,544,148 | A * | 12/1970 | Bela | E05B 85/14 292/336.3 |
| 7,059,641 | B2 * | 6/2006 | Chanya | E05B 85/107 292/336.3 |
| 7,699,365 | B2 * | 4/2010 | Liang | E05C 3/046 292/DIG. 20 |
| 8,746,759 | B2 * | 6/2014 | Bailey | E05B 85/12 292/DIG. 64 |
| 10,815,702 | B2 * | 10/2020 | Yoshino | E05B 85/103 |
| 11,598,128 | B2 * | 3/2023 | Murata | E05B 81/16 |

FOREIGN PATENT DOCUMENTS

| | | | | |
|---|---|---|---|---|
| DE | 102004054189 A1 * | 5/2006 | ............ | E05B 79/20 |
| DE | 102006027473 A1 * | 12/2007 | ............ | E05B 79/20 |
| DE | 102016114117 A1 * | 2/2018 | | |
| EP | 2910717 A2 * | 8/2015 | ............... | E05C 9/00 |
| JP | H01-150776 U | 10/1989 | | |
| JP | 2010127058 A * | 6/2010 | | |
| JP | 2017-133210 | 8/2017 | | |
| WO | WO-2013189695 A1 * | 12/2013 | ............. | E05B 81/76 |

* cited by examiner

DOOR OPENER FOR VEHICLE

CROSS-REFERENCE TO RELATED APPLICATIONS

This application is a continuation application of International Application No. PCT/JP2021/007518 filed on Feb. 26, 2021, and designating the U.S., which is based upon and claims priority to Japanese Patent Application No. 2020-044264, filed on Mar. 13, 2020, the entire contents of which are incorporated herein by reference.

BACKGROUND

1. Technical Field

The present disclosure relates to a door opener for a vehicle.

2. Description of the Related Art

A door of a vehicle such as an automobile is provided with a door opener including an operation member such as a door handle or a lever. In such a door opener, when the operation member is operated by a predetermined amount, a switch connected to the operation member is turned on, a control signal is generated, and a door lock is electrically released. In an emergency, a method of mechanically unlocking the door lock by performing an operation greater than a predetermined amount is adopted. Thus, the switch operates as a multistep switch.

RELATED-ART DOCUMENTS

Patent Documents

Patent Document 1: Japanese Patent Application Laid-Open No. 2017-133210

SUMMARY

Conventionally, a door opener that operates as a multistep switch is provided to release a door lock. However, such a door opener can also be used to operate a door that has both a drive unit for electrically driving the door and a mechanical linkage for driving the door by using an operation force as a driving force.

When such a door opener is applied to a door having an electric drive unit, the operation force required for operating the operation member is set to be small in an operation range for controlling the electric drive unit. Further, in the operation range in which the door is driven using the mechanical link mechanism, the operation force required for operating the operation member is set to be greater than the operation force required in the operation range in which the drive unit is electrically driven. In this way, by making the operation force required for the operation clearly different between the operation range for electrically driving the door and the operation range for mechanically driving the door, an operator who operates the door opener can discriminate a boundary of the operation ranges from the difference in the operation reaction force. Then, after the operation is completed and the hand is released from the operation member, the operating member automatically returns to an initial position.

However, in Patent Document 1, since the lever spring 18 is a spring whose elastic force increases according to the operation of the lever 14 starting from the initial position of the lever 14, the lever 14 is an operating member in which the operation force required for the operation increases upward to the right as the operation angle increases. Therefore, it is difficult to set the operation force required for operating the lever 14 to be kept small in a specific angle range. Further, it is difficult to generate an operation sensation that is easy to discriminate in an angle range in which the operation force is set small. Therefore, in the angle range in which the operation force is set to be small, it is difficult to generate an operation sensation in which it is easy to discriminate between the operation range before the switch of the electric drive unit is turned on and the operation range in which the switch of the electric drive unit is turned on.

An object of the present disclosure is to provide a door opener for a vehicle capable of easily discriminating an operation sensation generated in an operation range before the switch of an electric drive unit is turned on and an operation range in which the switch of the electric drive unit is turned on.

According to one aspect of the present embodiment, a door opener for a vehicle includes a housing; an operation lever attached to the housing such as to be rotatable around a rotation shaft between an initial position and a terminal position; a first switch configured to generate a control signal; a connector connected to a second switch that mechanically opens a door of a vehicle; a tactile sensation generating mechanism; and an elastic body for return that returns the operation lever. The first switch and the second switch are turned off when a rotation angle of the operation lever is in a first angle range. When the rotation angle of the operation lever is in a second angle range of greater angles than in the first angle range, the first switch is turned on, a tactile sensation is generated by the tactile sensation generating mechanism, and the second switch remains turned off. When the rotation angle of the operation lever is in a third angle range of greater angles than in the second angle range, the second switch is turned on.

DETAILED DESCRIPTION

Figure 1:
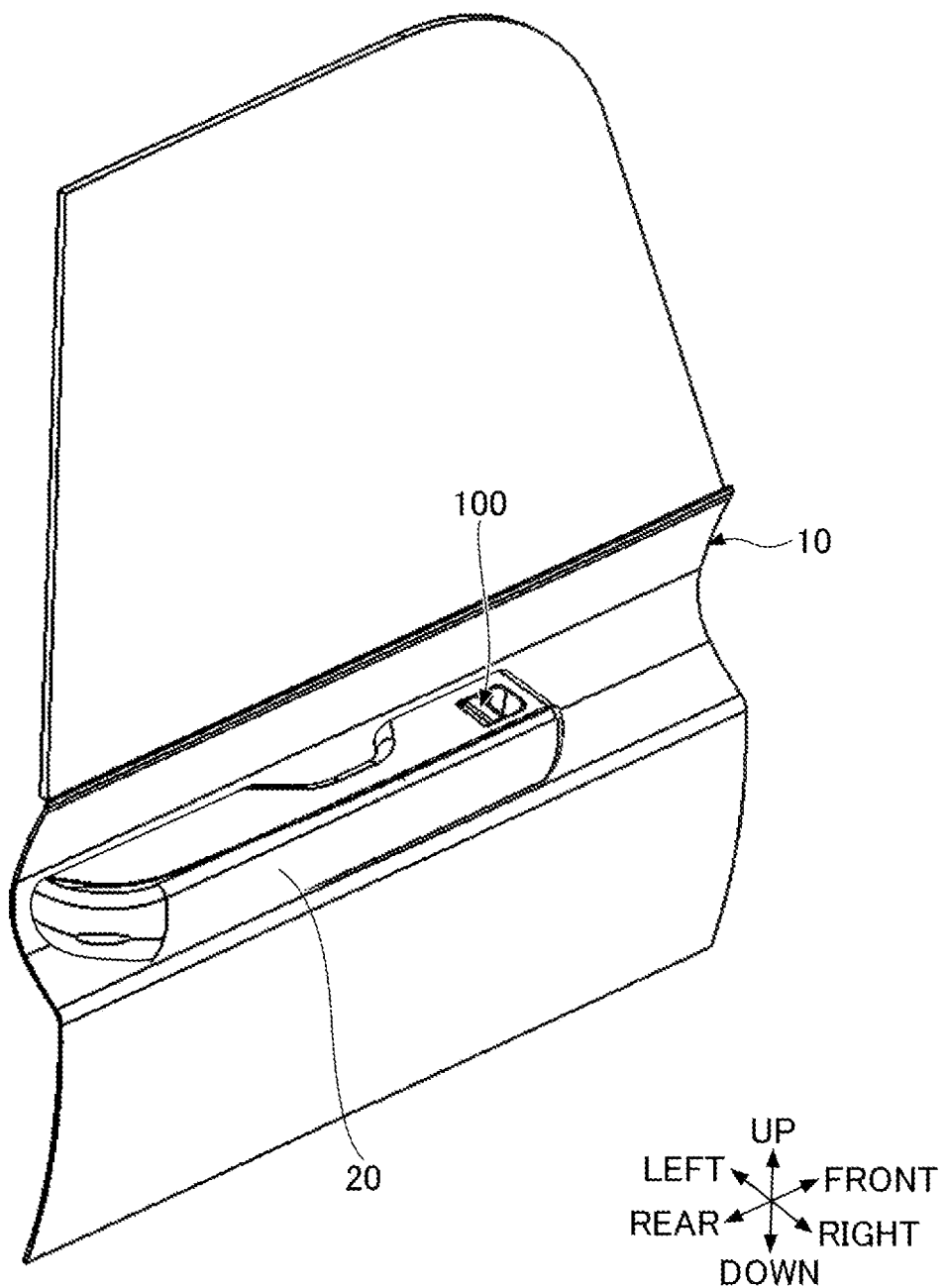
FIG. 1 is a perspective view of a door to which a door opener for a vehicle according to the present embodiment is attached.

Hereinafter, embodiments of the present invention will be described. The same members and the like are denoted by the same reference numerals, and description thereof is omitted. In the present embodiment, in the drawings, a direction corresponding to a height direction of a vehicle is referred to as an "up-down direction", a direction corresponding to a width direction of the vehicle is referred to as a "left-right direction", and a direction corresponding to a length direction of the vehicle is referred to as a "front-rear direction".

<Door Opener for Vehicle>

Figure 2:
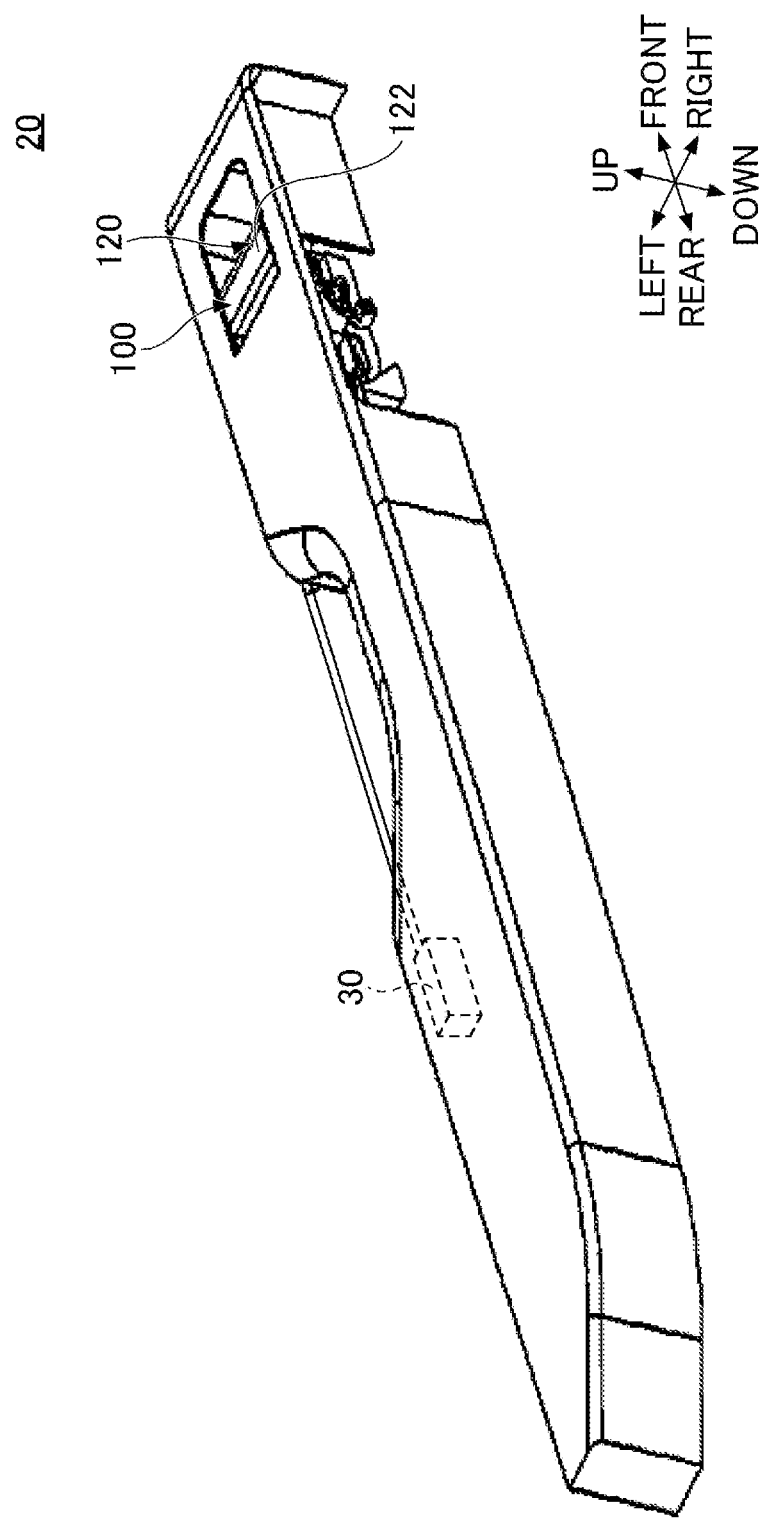
FIG. 2 is a perspective view of a door handle of a door to which the door opener for a vehicle according to the present embodiment is attached.

As illustrated in FIG. 1, a door opener for a vehicle 100 in the present embodiment is attached to an armrest 20 with a grip handle provided inside a door 10 of the vehicle. FIG. 2 is a perspective view of the armrest 20 to which the door opener for a vehicle 100 is attached. Further, the door opener for a vehicle 100 is disposed at a position closer to the front side of the armrest 20 in the vehicle so that an operator sitting on the driver's seat of the vehicle can easily rotate an operation lever 120 in a state in which the elbow or wrist is placed on the upper surface of the armrest 20. Further, the door opener for a vehicle 100 is disposed such that the operation lever 120 can be seen from an opening provided on the upper surface of the armrest 20 when viewed from above so that the operator can pull and operate the operation lever 120 while the elbow or a wrist is placed on the upper surface of the armrest 20.

An operator who operates the door opener for a vehicle 100 can drive an electric drive unit (not illustrated) by rotating the operation lever 120 and open the door 10 by the driving. Further, the operation lever 120 is connected to a mechanical switch 30 including a link mechanism (not illustrated), and the operator who operates the door opener for a vehicle 100 can transmit an operation force to the mechanical switch 30 by rotating the operation lever 120. Further, the link mechanism has a function of opening the door 10 by using the operation force transmitted to the mechanical switch 30 as a driving force, and the operator who operates the door opener for a vehicle 100 can open the door 10 by the operation force of rotating the operation lever 120. The operation angle of the operation lever 120 for driving the electric drive unit and the operation angle of the operation lever 120 for driving the link mechanism are adjusted so as not to overlap with each other.

Figure 3:
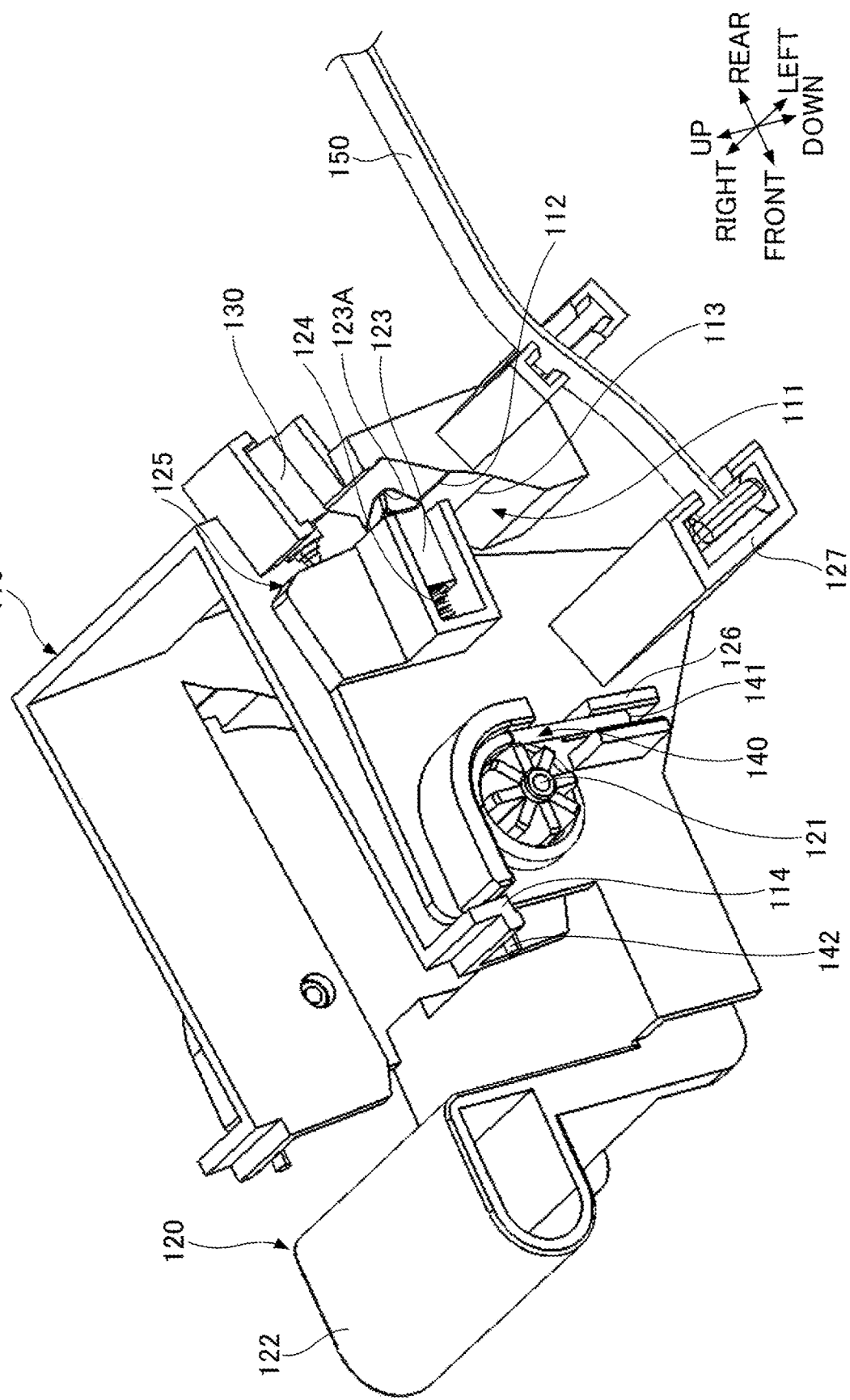
FIG. 3 is a perspective view of a door opener for a vehicle according to the present embodiment.
Figure 4:
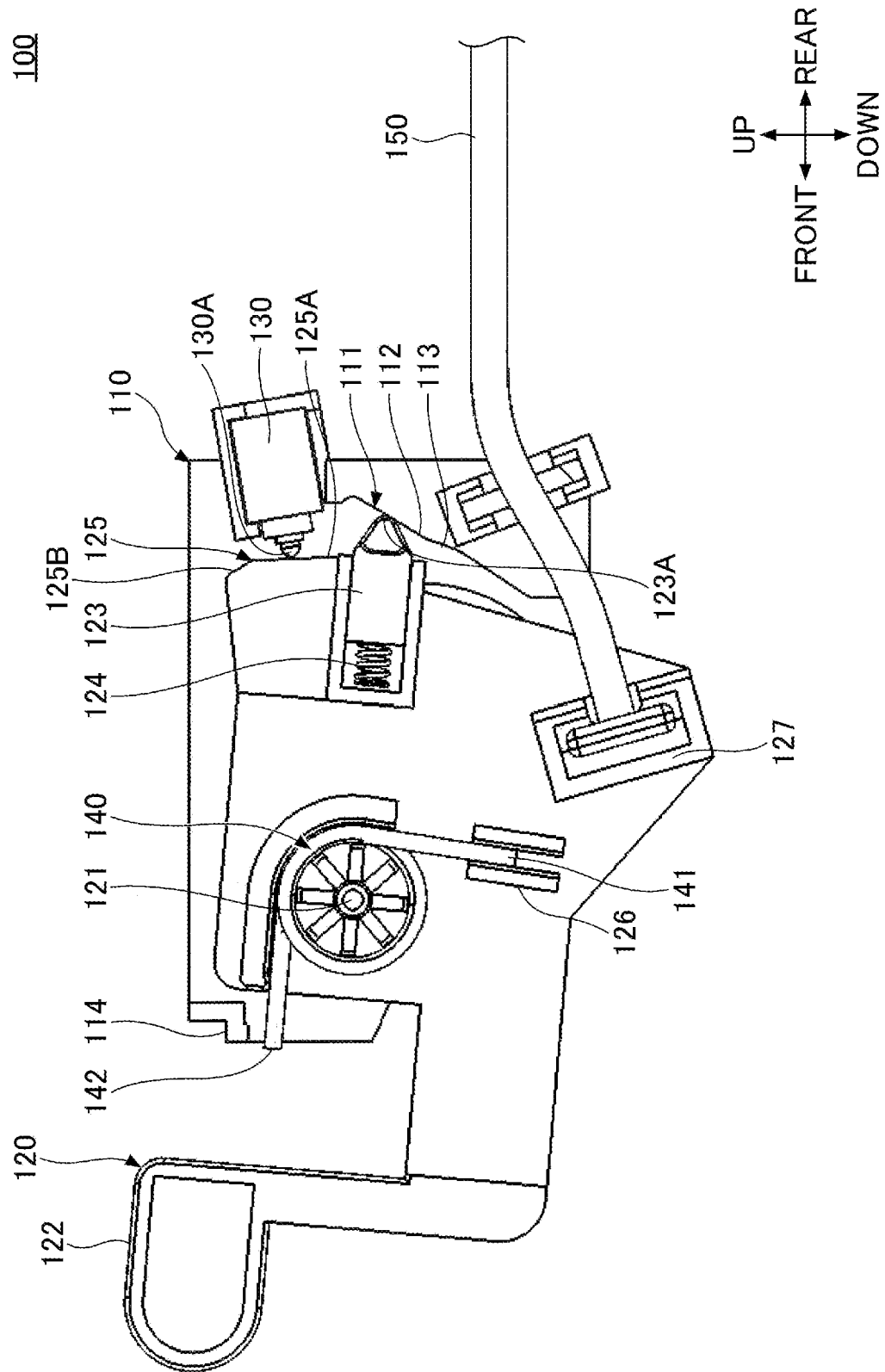
FIG. 4 is a right side view of a door opener for a vehicle according to the present embodiment.
Figure 5:
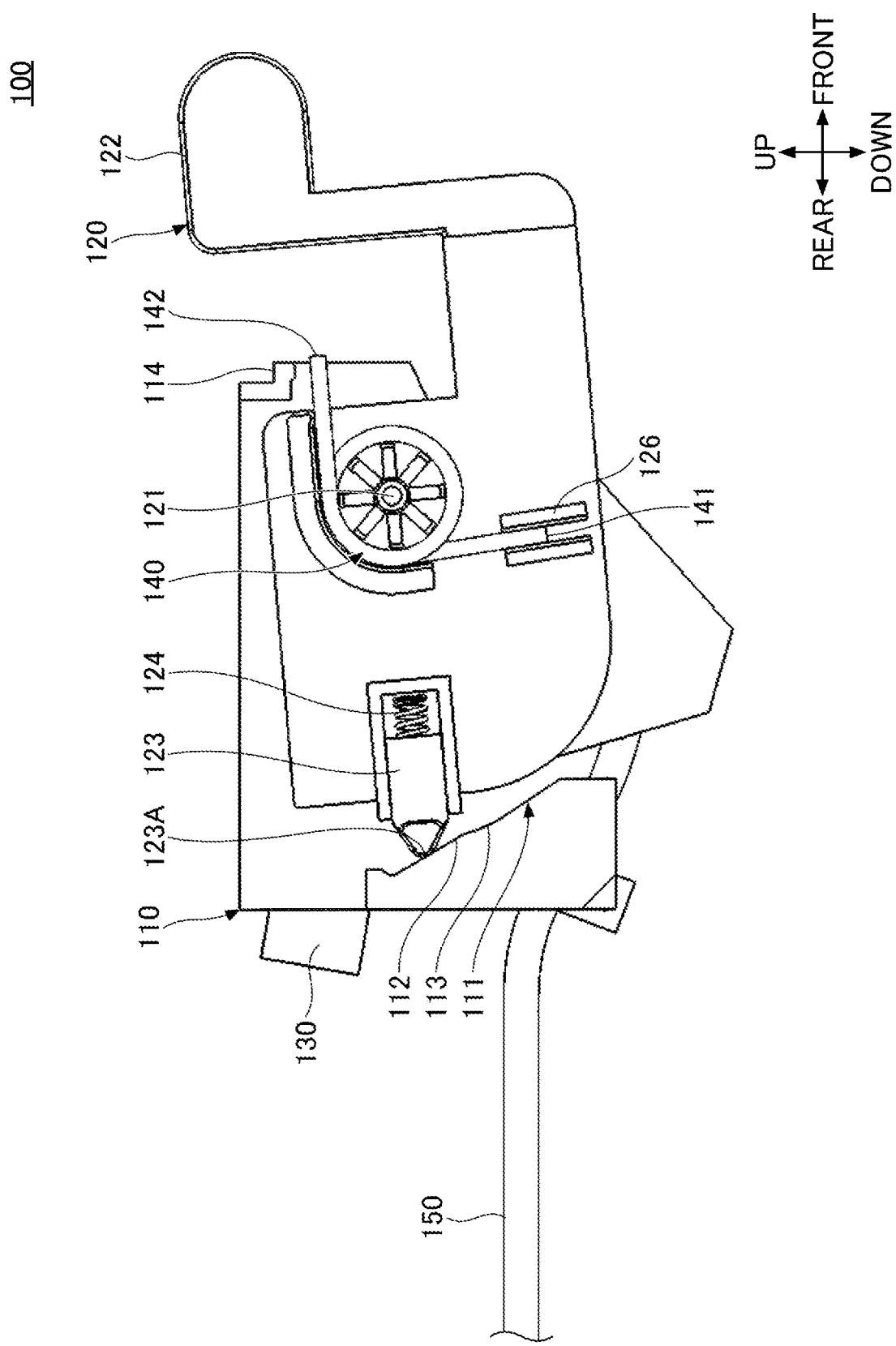
FIG. 5 is a left side view of a door opener for a vehicle according to the present embodiment.
Figure 6:
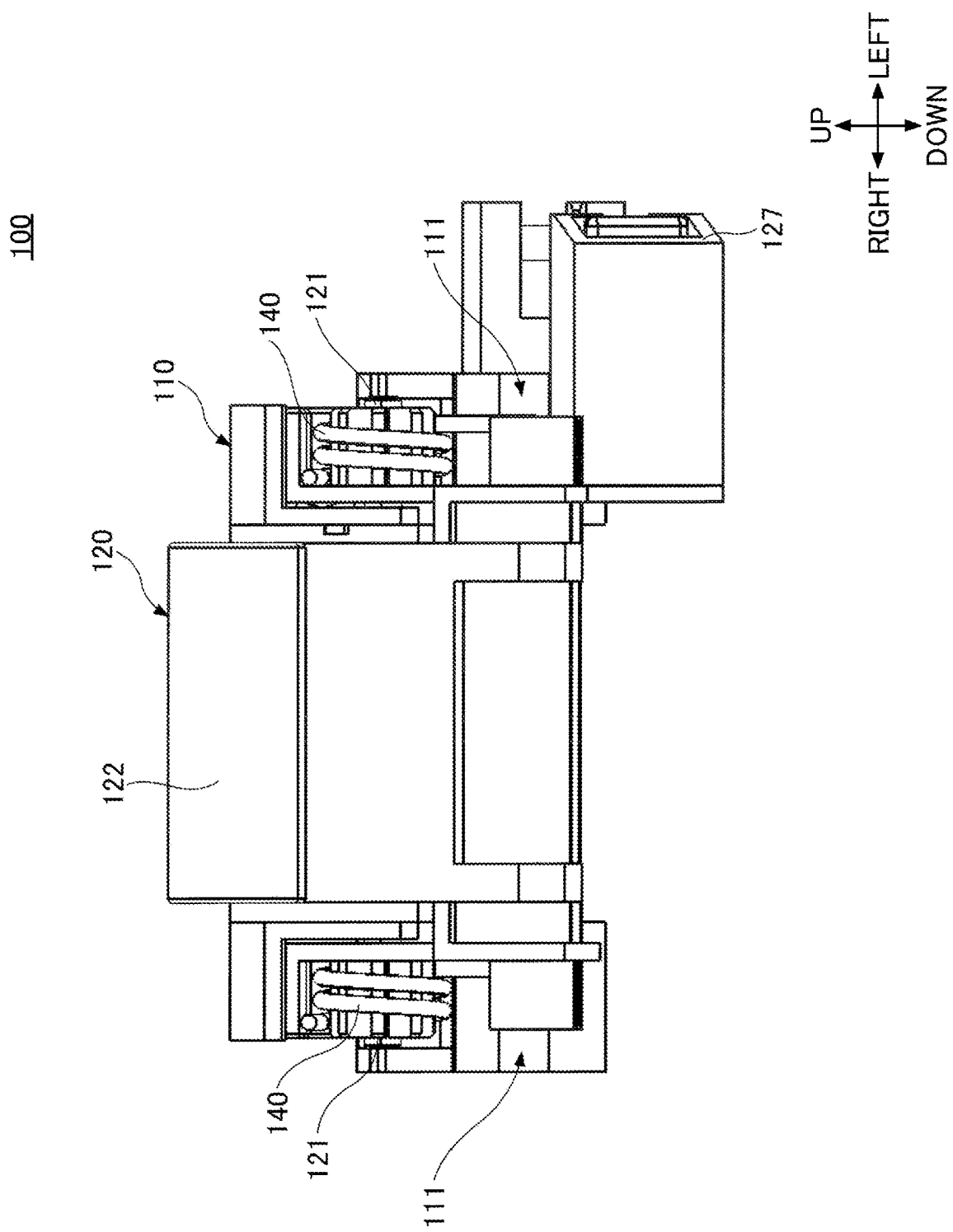
FIG. 6 is a front view of a door opener for a vehicle according to the present embodiment.
Figure 7:
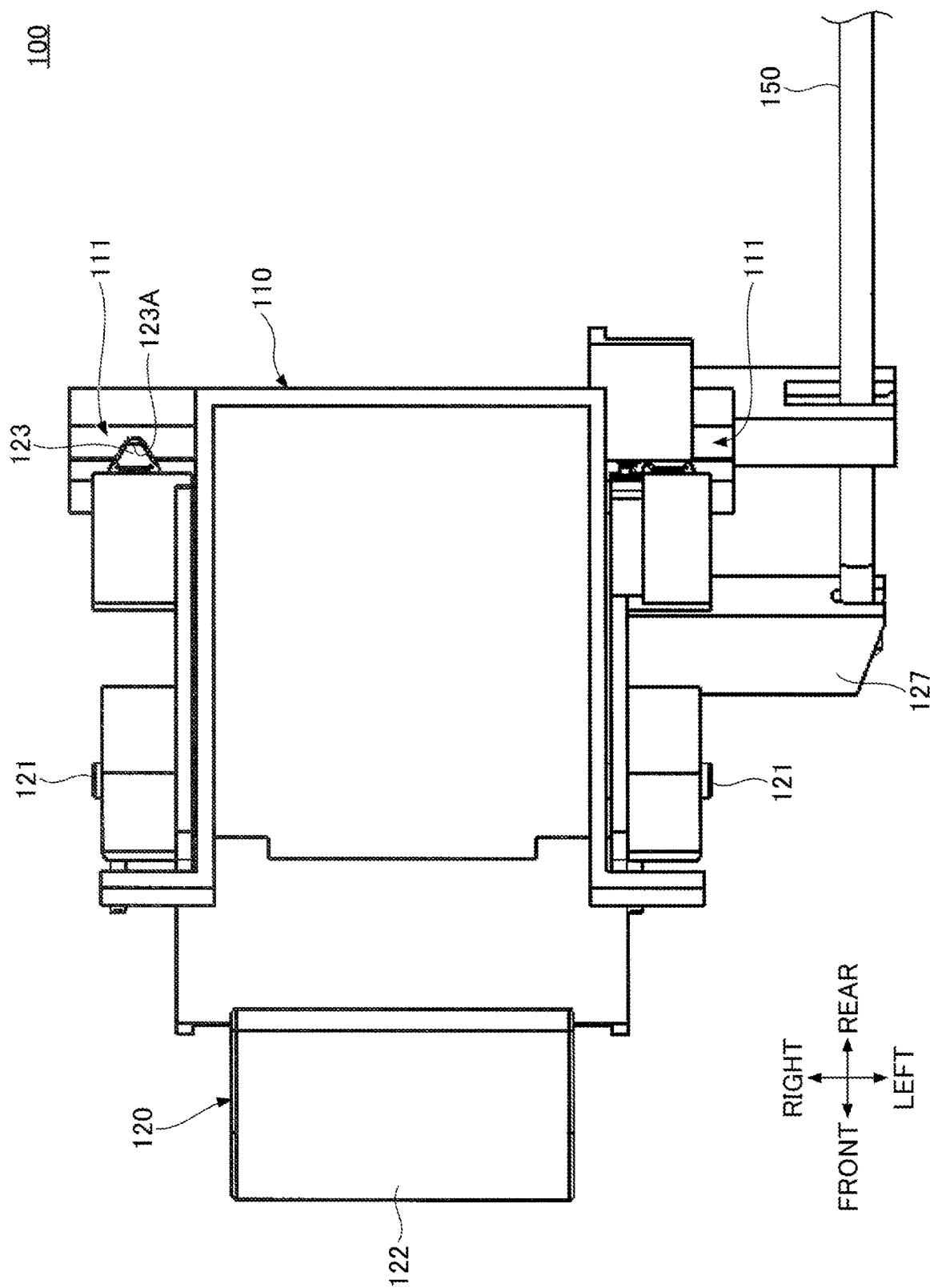
FIG. 7 is a top view of a door opener for a vehicle according to the present embodiment.

A structure of the door opener for a vehicle 100 according to the present embodiment will be described with reference to FIG. 3 to FIG. 7. FIG. 3 is a perspective view of the door opener for a vehicle 100 according to the present embodiment, FIG. 4 is a right side view, FIG. 5 is a left side view, FIG. 6 is a front view, and FIG. 7 is a top view.

The door opener for a vehicle 100 according to the present embodiment includes a housing 110 and the operation lever 120 attached to the housing 110.

The operation lever 120 is attached to the housing 110 in a rotatable state around a rotation shaft 121, and an operation portion 122 to be operated by a hand of a person is provided. As illustrated in FIG. 2, the operation portion 122 of the operation lever 120 is disposed such that the upper surface thereof covers approximately half of the opening provided on the upper side of the armrest 20. The operator can touch the surface on the front side and the surface on the lower side of the operation portion 122 by inserting a finger from a gap that is not blocked by the operation portion 122 in the opening. Further, the operator can rotate the operation lever 120 around the rotation shaft 121 by performing an operation of pulling up the operation portion 122 with a finger placed on the operation portion 122.

The operation lever 120 includes a protrusion member 123 and a coil spring 124 for pressing the protrusion member 123 toward the housing 110. The housing 110 is provided with a sliding surface 111 on which a tip portion 123A of the protrusion member 123 slides when the operation lever 120 rotates around the rotation shaft 121. On the sliding surface 111, a protruding portion 112 which is protrudes toward the operation lever 120 and a recessed portion 113 which is recessed from the operation lever 120 are formed. The protruding portion 112 has a protruding shape by being continuously formed from the recessed portion 113 having a recessed shape. When a rotation angle of the operation lever 120 is 11.5°, the tip portion 123A of the protrusion member 123 comes into contact with a boundary between the protruding portion 112 and the recessed portion 113.

Further, in FIG. 4, an electric switch 130 that generates a control signal for controlling an electric drive unit that electrically drives the door 10 to open the door 10 is attached to the rear side of the housing 110. The switch 130 includes a pressing portion 130A capable of switching contacts by being pressed, and is disposed at a position facing a pressing portion 125 provided on the rear side of the operation lever 120. The pressing portion 130A is disposed so as to face the pressing portion 125. In the pressing portion 125, a first pressing surface 125A and a second pressing surface 125B in which a pressing amount with respect to the pressing portion 130A of the switch 130 changes according to the rotation operation of the operation lever 120 are continuously formed. The first pressing surface 125A of the pressing portion 125 comes closest to the pressing portion 130A and presses the pressing portion 130A in an angle range in which the rotation angle of the operation lever 120 is 10° to 11.5°. The switch 130 whose pressing portion 130A is pressed is electrically turned on. The switch 130 is electrically connected to an electric drive unit (not illustrated) that electrically drives the door 10, and when electrically turned on, generates a control signal for driving the electric drive unit, and transmits the control signal to the electric drive unit. Upon receiving the control signal, the electric drive unit drives the door 10 to open the door 10.

As illustrated in FIG. 4, the sliding surface 111 provided in the housing 110 includes the protruding portion 112 and the recessed portion 113 which are formed at different distances from the rotation shaft 121. Since the protruding portion 112 and the recessed portion 113 are continuously and smoothly formed, the sliding surface 111 is a curved surface. The sliding surface 111 is provided so as to face the protrusion member 123 that is operably attached with respect to the operation lever 120 and is provided with a variable distance from the rotation shaft 121. In the present embodiment, the protrusion member 123 slides in a direction parallel to a normal to a circle centered on the rotation shaft 121, so that the distance from the rotation shaft 121 changes. On the sliding surface 111 side of the protrusion member 123, the tip portion 123A having a shape tapered toward the sliding surface 111 and in contact with the sliding surface 111 is provided. The tip portion 123A is formed to have a slightly curved surface shape so as to be smoothly slidable on the sliding surface 111. In the state illustrated in FIG. 4, a restoring force from the coil spring 124 acts on the protrusion member 123 provided on the operation lever 120 in a direction of pushing the sliding surface 111 of the housing 110. Therefore, when the operation lever 120 is rotated from the state illustrated in FIG. 4, a tactile sensation is generated by the protruding portion 112 and the recessed portion 113 provided on the sliding surface 111 of the housing 110 and the protrusion member 123 and the coil spring 124 provided on the operation lever 120, and thus, these may be described as a tactile sensation generating mechanism. Further, the coil spring 124 is an example of an elastic body for tactile sensation generation. The tactile sensation generating mechanism generates an operation sensation when a magnitude of the restoring force by the coil spring 124 is changed. The operation sensation generated by the tactile sensation generating mechanism is transmitted to the hand of the operator who operates the operation portion 122. Since the magnitude of the restoring force by the coil spring 124 is determined by a relational expression that uses a spring constant and a contraction amount of the coil spring 124, a contact angle between the tip portion 123A and the sliding surface 111, and the like as variables, the restoring force can be adjusted by adjusting these values. The magnitude of the restoring force of the coil spring 124 can also be adjusted by a coefficient of friction between the tip portion 123A and the sliding surface 111 and the distances from the rotation shaft 121 to the sliding surface 111.

Further, as illustrated in FIG. 6, torsion springs 140 are attached to both sides of the operation lever 120 in the left and right directions. The torsion springs 140 are attached such that the center of the wound portion substantially coincides with the rotation shaft 121 of the operation lever 120. Further, as illustrated in FIG. 3 to FIG. 5, one end portion 141 of the torsion spring 140 is a fixed end, and is supported and fixed by a support portion 126 provided on the operation lever 120. The other end portion 142 of the torsion spring 140 is a movable end. The other end portion 142 does not come into contact with the housing 110 when an angle range of the rotation angle of the operation lever 120 is 0° to less than 10°, and comes into contact with a locking portion 114 provided in the housing 110 when the angle range of the rotation angle of the operation lever 120 is 10° or more. The torsion spring 140 in which the other end portion 142 is in contact with the locking portion 114 is elastically deformed according to the contact with the locking portion 114 when an operation is performed such that the rotation angle of the operation lever 120 becomes greater than 10°, and applies a restoring force to the support portion 126 and the operation lever 120 on which the support portion 126 is formed according to the deformation amount. A cable connection portion 127 is provided on the right side surface of the operation lever 120 at a position spaced apart from the rotation shaft 121, and a cable 150 serving as a transmission member is connected to the cable connection portion 127. The mechanical switch 30 is connected to the cable 150 as illustrated in FIG. 2. The mechanical switch 30 includes a door unlock mechanism (not illustrated) and a link mechanism (not illustrated) that generates a driving force for mechanically opening the door 10 by using an operation force applied to the operation lever 120. Therefore, when the operation lever 120 is rotated by the operation force from the operator, the position of the cable connection portion 127 is changed along with the rotation of the operation lever 120, and the cable 150 is pulled. Then, the mechanical switch 30 connected to the cable 150 is turned on, and the door unlock mechanism in the mechanical switch 30 is operated to forcibly perform the unlocking operation. Therefore, even if the locked state of the door 10 is maintained when, for example, a separately provided electric door lock mechanism does not operate due to failure, the locked state of the door 10 is released. At the same time, the operation force from the operator is transmitted to the door 10 via the link mechanism in the mechanical switch 30, and the door 10 is mechanically driven to open. In the present application, the coil spring 124 may be referred to as the elastic body for tactile sensation generation, and the torsion spring 140 may be referred to as an elastic body for return. Further, the electrical switch 130 may be referred to as a first switch, and the mechanical switch 30 may be referred to as a second switch. Further, the cable connection portion 127 may also be referred to as a connector.

<Operation of Door Opener for Vehicle>

Next, an operation of a door opener for a vehicle according to the present embodiment will be described with reference to FIG. 8 to FIG. 21.

Figure 8:
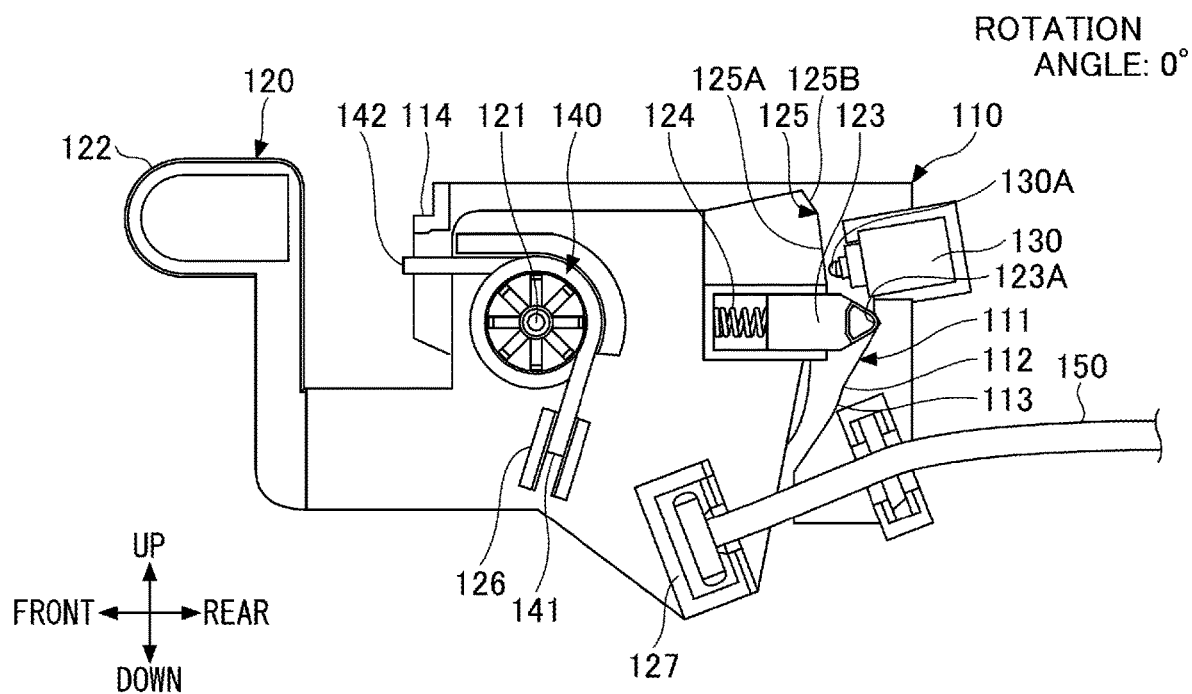
FIG. 8 is an explanatory view (1) of an operation of a door opener for a vehicle according to the present embodiment.
Figure 9:
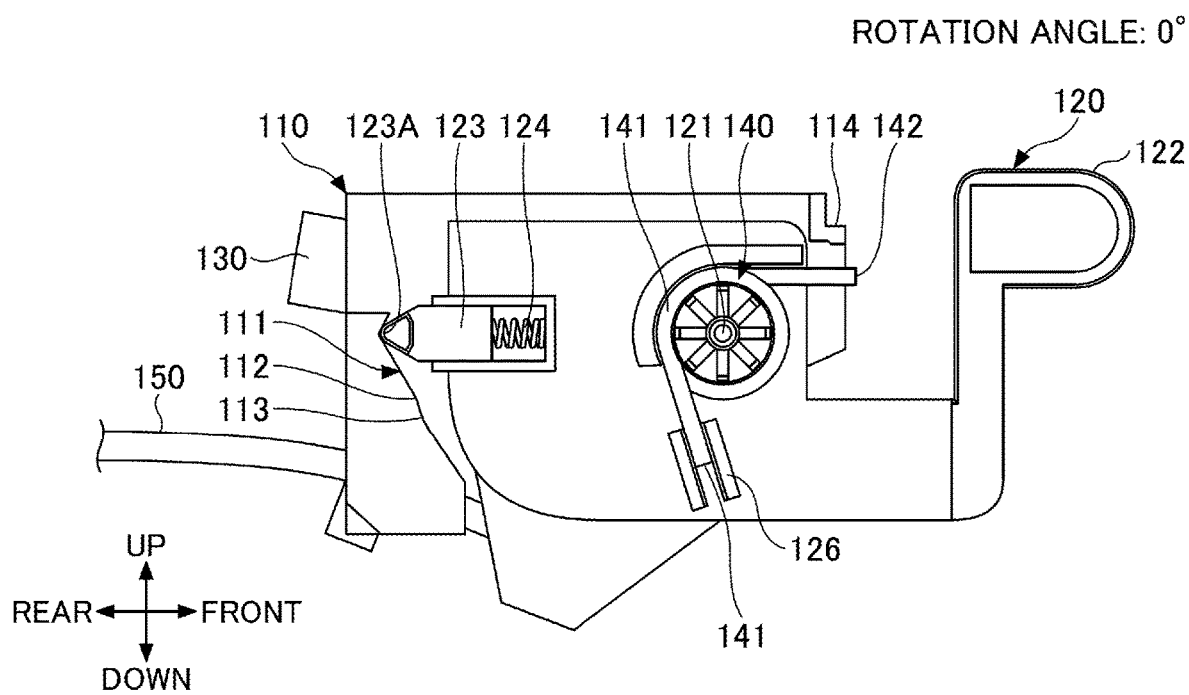
FIG. 9 is an explanatory view (2) of an operation of a door opener for a vehicle according to the present embodiment.

FIG. 8 and FIG. 9 illustrate a state where the operation lever 120 is not operated, that is, a state where the operation lever 120 is not rotated and the rotation angle of the operation lever 120 is 0°. In the present disclosure, the position of the operation lever 120 at which the rotation angle is 0° may be referred to as an initial position. FIG. 8 is a right side view and FIG. 9 is a left side view of this state. In this state, the switch 130 attached to the housing 110 is not pressed by the operation lever 120 and is in OFF state. Further, the tip portion 123A of the protrusion member 123 provided on the operation lever 120 is pressed against the sliding surface 111 of the housing 110 by the restoring force of the coil spring 124. The other end portion 142 of the torsion spring 140 is not in contact with the housing 110, and the restoring force is not generated. In this state, a part of the operation lever 120 (not illustrated) is in contact with a part of the housing 110 (not illustrated). Therefore, the operation lever 120 is in a state where the rotation angle does not become a smaller angle, that is, in a state where the rotation angle at which the operation lever 120 rotates around the rotation shaft 121 is minimum.

Figure 10:
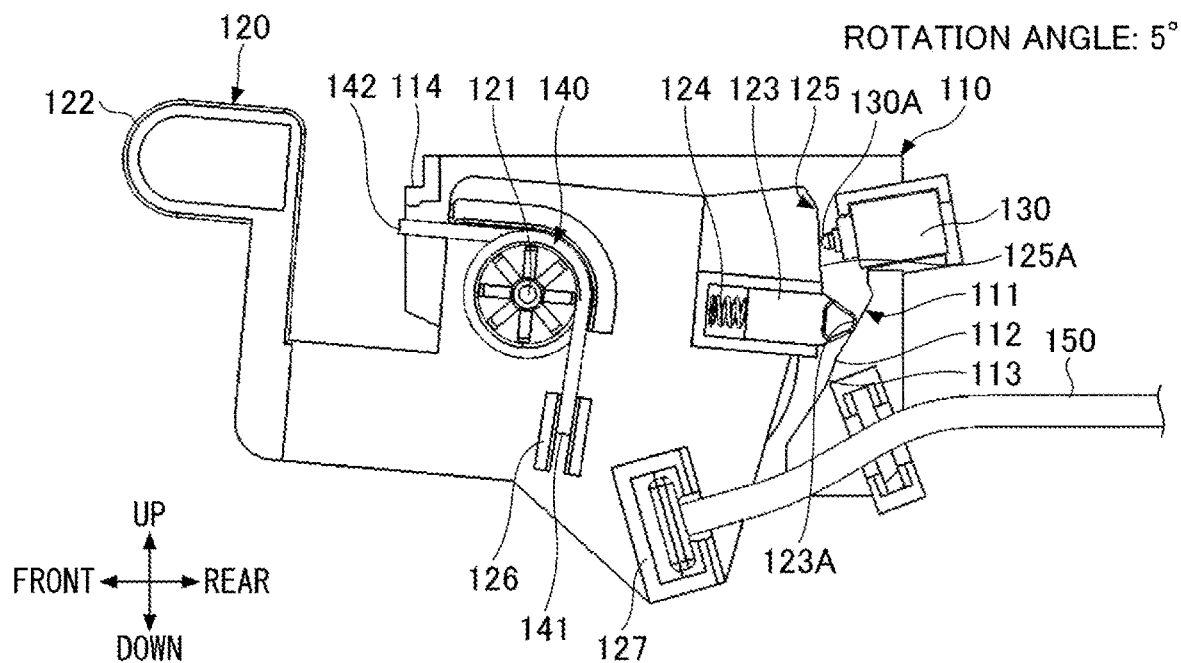
FIG. 10 is an explanatory view (3) of an operation of a door opener for a vehicle according to the present embodiment.
Figure 11:
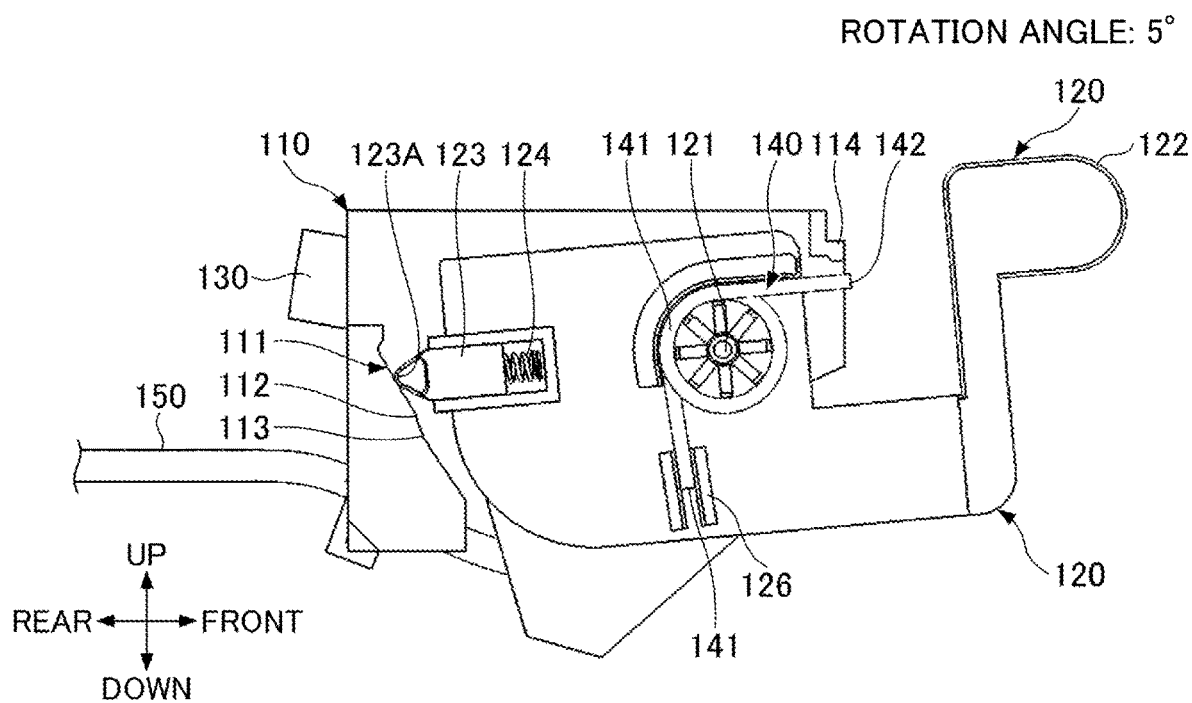
FIG. 11 is an explanatory view (4) of an operation of a door opener for a vehicle according to the present embodiment.

FIG. 10 and FIG. 11 illustrate a state where the operation lever 120 rotates around the rotation shaft 121, and the rotation angle of the operation lever 120 is 5°. FIG. 10 is a right side view and FIG. 11 is a left side view of this state. In this state, the pressing portion 130A of the switch 130 attached to the housing 110 is in contact with the first pressing surface 125A of the operation lever 120, but is not pressed and remains in OFF state. Further, the tip portion 123A of the protrusion member 123 provided on the operation lever 120 is pressed against the sliding surface 111 of the housing 110 by the restoring force of the coil spring 124 more strongly than when the rotation angle is 0°. Therefore, the restoring force acts on the operation lever 120 in a direction in which the operation lever 120 returns to its original position, that is, in a direction in which the rotation angle of the operation lever 120 decreases. The other end portion 142 of the torsion spring 140 is a movable end and is configured to be in contact with the locking portion 114 of the housing 110 when the rotation angle is greater than 10°, but is not contact with the housing 110 when the rotation angle is 5°, so that no restoring force is generated.

Figure 12:
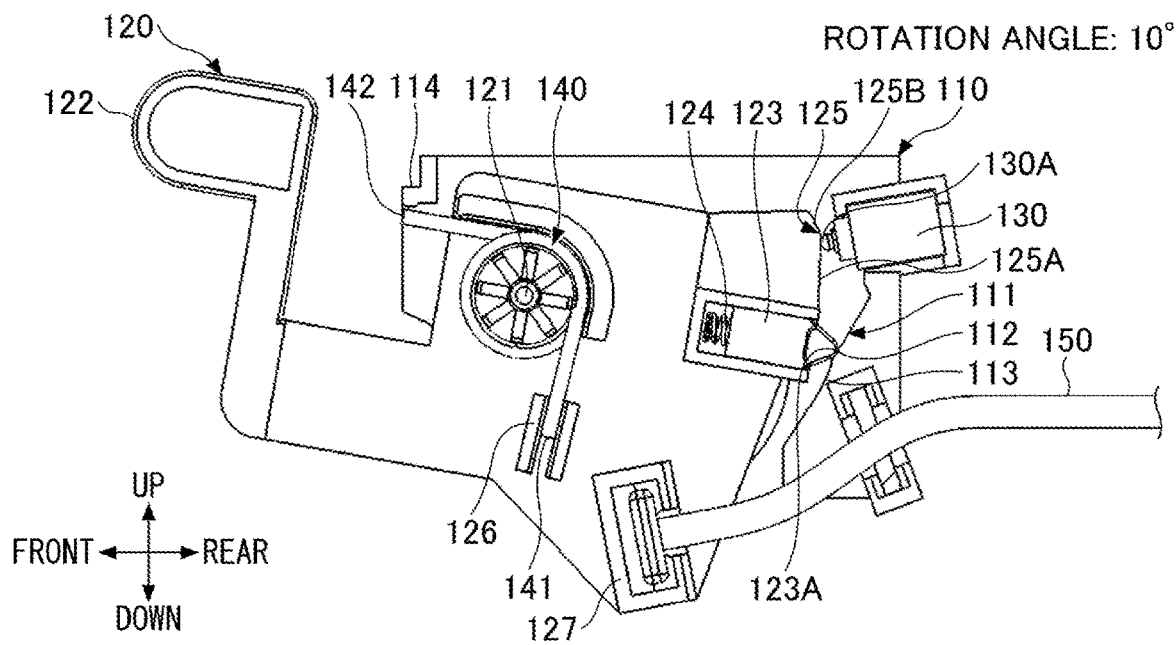
FIG. 12 is an explanatory view (5) of an operation of a door opener for a vehicle according to the present embodiment.
Figure 13:
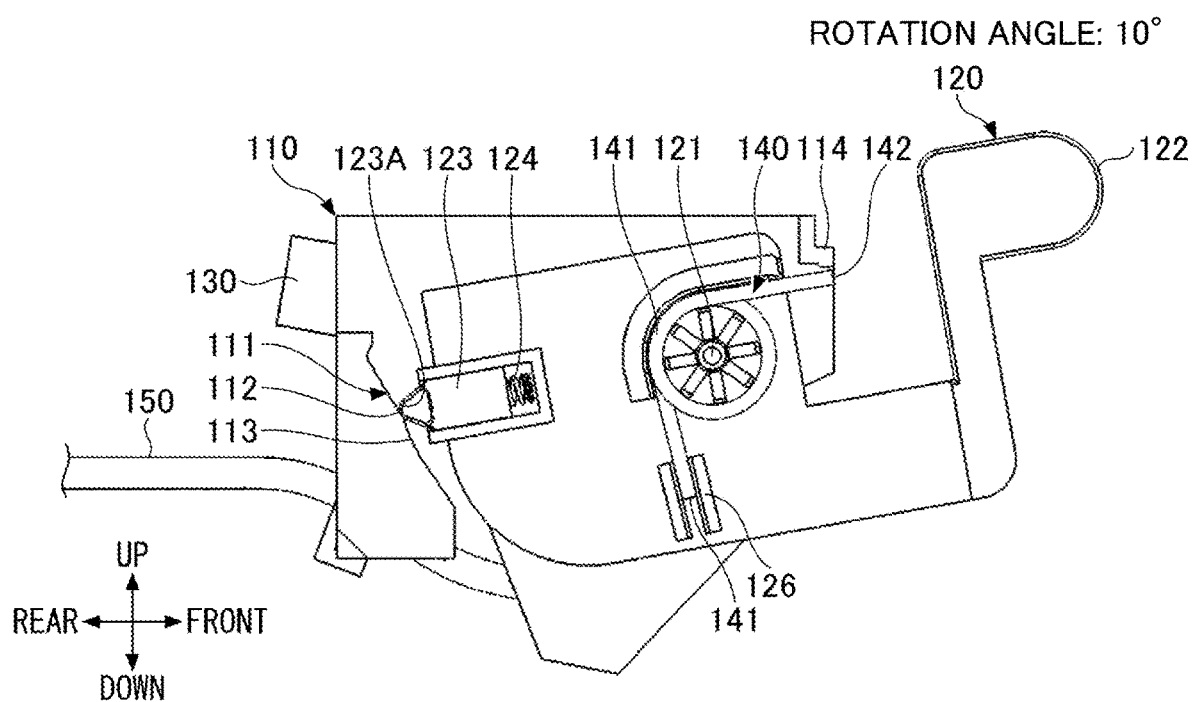
FIG. 13 is an explanatory view (6) of an operation of a door opener for a vehicle according to the present embodiment.

FIG. 12 and FIG. 13 illustrate a state where the operation lever 120 further rotates around the rotation shaft 121, and the rotation angle of the operation lever 120 is 10°. FIG. 12 is a right side view and FIG. 13 is a left side view of this state. In this state, the switch 130 attached to the housing 110 is turned on when the pressing portion 130A is pressed by the first pressing surface 125A provided on the switch 130 side of the operation lever 120, and a control signal is generated. The control signal is transmitted to an electric drive unit (not illustrated), and the electric drive unit that has received the control signal is driven to open the door 10. Further, the sliding surface 111 is provided with a curved surface having a curvature in which the distance from the tip portion 123A of the protrusion member 123 to the rotation shaft 121 gradually decreases according to the rotation of the operation lever 120 when the operation lever 120 is operated in a direction in which the rotation angle changes from 0° to 10°. At this time, although the coil spring 124 is gradually compressed, the contact angle between the tip portion 123A and the sliding surface 111 gradually decreases, so the magnitude of the restoring force by the coil spring 124 is maintained at a constant positive value. Therefore, when the operator releases the operation lever 120 after operating the operation lever 120 until the rotation angle becomes 10°, the operation lever 120 rotates such that the rotation angle of the operation lever 120 returns to the original state of 0° by the restoring force of the coil spring 124. Further, the other end portion 142 of the torsion spring 140 is in contact with the locking portion 114 of the housing 110, but since the torsion spring 140 is not deformed, no restoring force is generated.

Figure 22:
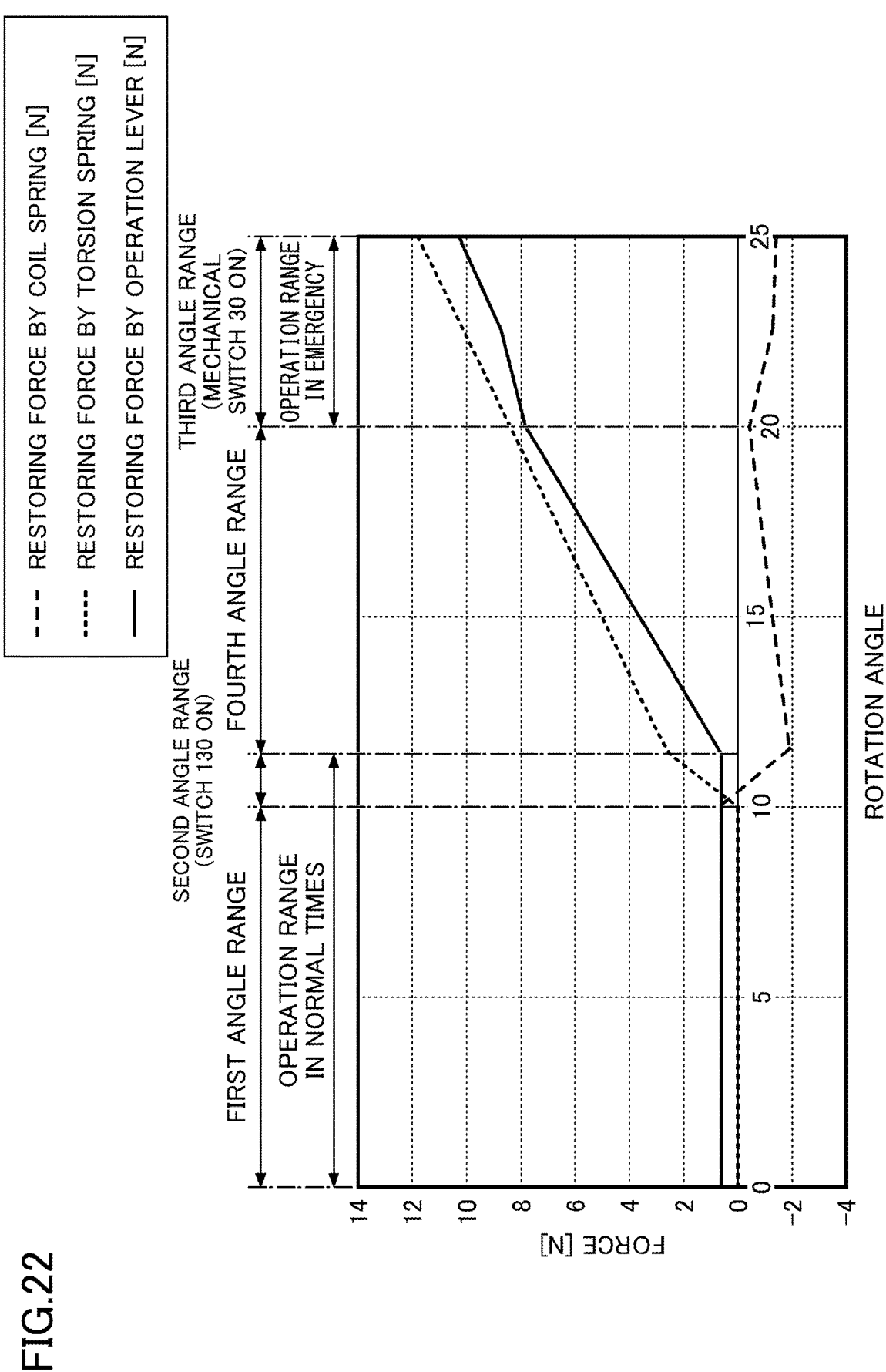
FIG. 22 is an explanatory view of a restoring force generated in a door opener for a vehicle according to the present embodiment.

As illustrated in FIG. 22, the magnitudes of the restoring force by the coil spring 124 and the restoring force of the operation lever 120 in the present embodiment are adjusted so as to be constant at 0.8 [N] in an angle range of the rotation angle of the operation lever 120 from 0° to 10°. However, in this angle range, the magnitudes of the restoring force by the coil spring 124 and the restoring force of the operation lever 120 may be, for example, 0.6 [N] or 1.0 [N]. Further, adjustment may be made to a non-constant value including an increase or decrease within 0.2 [N]. Accordingly, since it is difficult to discriminate a difference of approximately 0.2 [N] by human tactile sense, the operator who operates the operation portion 122 feels as if the operation sensation is constant when the operation lever 120 is operated in the angle range of 0° to 10°.

By providing an angle range in which the magnitude of the restoring force by the coil spring 124 is constant, when the magnitude of the restoring force by the coil spring 124 suddenly changes from a constant state, the operator can feel a difference in operation sensation before and after the change point.

As illustrated in FIG. 22, in the present embodiment, the magnitude of the restoring force by the coil spring 124 is constant at 0.8 [N] in the angle range of the rotation angle from 0° to 10°, and starts to decrease when the rotation angle becomes greater than 10°. Then, when the operation lever 120 is rotated until the rotation angle changes from 10° to 11.5°, the magnitude of the restoring force by the coil spring 124 decreases from 0.8 [N] to −2.1 [N]. Therefore, when the rotation operation is performed from a state where the rotation angle is less than 10° to a state where the rotation angle exceeds 10°, the operator can feel a difference in operation sensation.

By providing an angle range in which the magnitude of the restoring force of the operation lever 120 is constant, when the magnitude of the restoring force of the operation lever 120 suddenly changes from a constant state, the operator can feel a difference in operation sensation before and after the change point.

In the present embodiment, the magnitude of the restoring force of the operation lever 120 is constant at 0.8 [N] in the angle range of the rotation angle from 0° to 10°, and the rotation angle changes from 0.8 [N] to 0.6 [N] in a range of the rotation angle from 10° to 11.5° as described later in detail, but there is almost no change. Further, when the rotation operation is performed with the rotation angle greater than 11.5°, the restoring force starts to increase, and when the operation lever 120 is rotated until the rotation angle becomes 20° from 11.5°, the magnitude of the restoring force of the operation lever 120 increases from 0.6 [N] to 7.9 [N]. Therefore, when the rotation operation is performed from a state where the rotation angle is less than 11.5° to a state where the rotation angle exceeds 110.5°, the operator can feel a difference in operation sensation.

Figure 14:
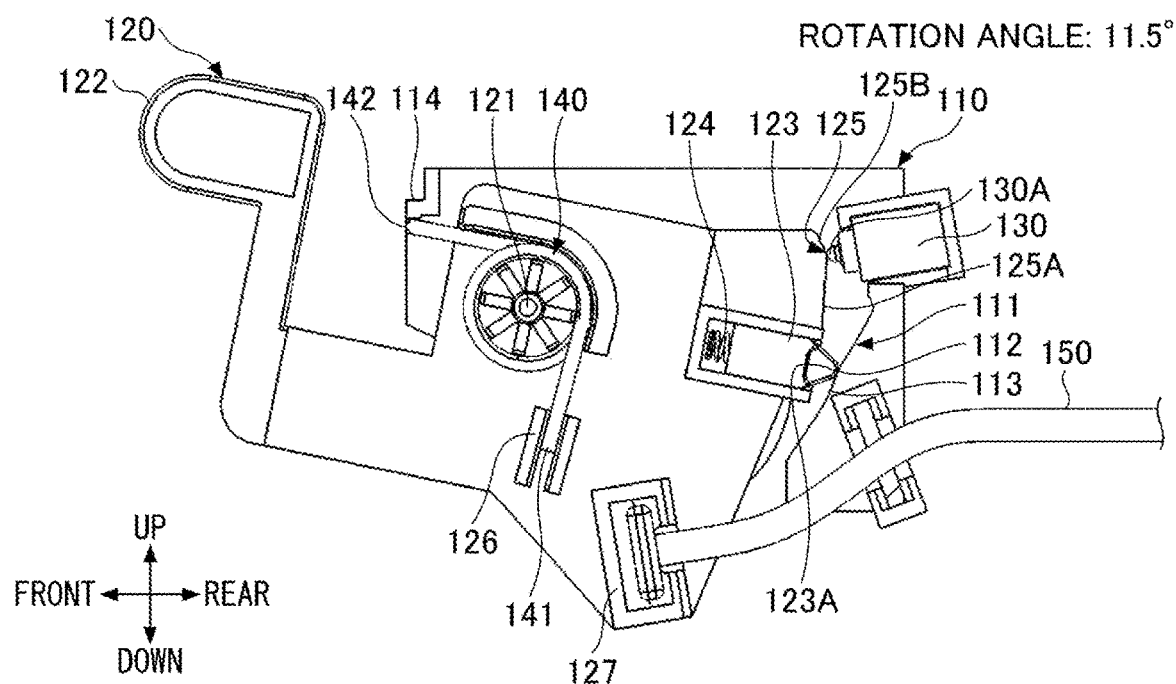
FIG. 14 is an explanatory view (7) of an operation of a door opener for a vehicle according to the present embodiment.
Figure 15:
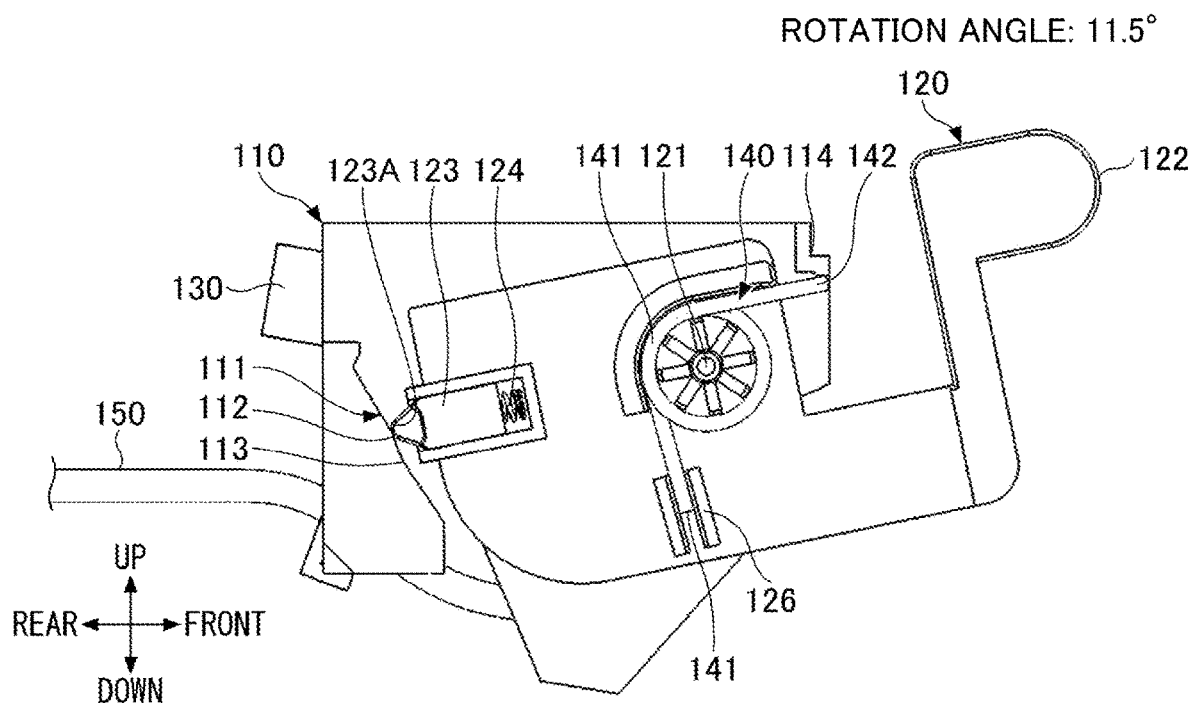
FIG. 15 is an explanatory view (8) of an operation of a door opener for a vehicle according to the present embodiment.

FIG. 14 and FIG. 15 illustrate a state where the operation lever 120 is further rotated around the rotation shaft 121 and the rotation angle of the operation lever 120 becomes 11.5°. FIG. 14 is a right side view and FIG. 15 is a left side view of this state. In this state, the switch 130 attached to the housing 110 is in ON state as the pressing portion 130A is pressed by the first pressing surface 125A of the pressing portion 125 provided on the operation lever 120. Further, the pressing portion 125 has a shape as a corner of a polygon that approaches the switch 130 when the rotation angle of the operation lever 120 is in an angle range of 10° to 11.5°, and the second pressing surface 125B is formed by chamfering the corner of the polygon. The pressing portion 130A of the switch 130 is in contact with the boundary between the first pressing surface 125A and the second pressing surface 125B when the rotation angle of the operation lever 120 is 11.5°, and comes into contact with the second pressing surface 125B when the rotation angle of the operation lever 120 is greater than 11.5°. Therefore, when the rotation angle of the operation lever 120 is greater than 11.5°, the pressing portion 130A is in contact with the second pressing surface 125B to increase the distance between the second pressing surface 125B and the switch 130. Accordingly, a pressing amount of the pressing portion 130A decreases, and the switch 130 is turned off.

Further, in the tactile sensation generating mechanism, when the operation lever 120 is operated in a direction from the state where the rotation angle is 10° to the state where the rotation angle is 11.5°, the tip portion 123A of protrusion member 123 rides on the top of the protruding portion 112 of the sliding surface 111 from the rotation angle of 10° to 11.5°. At this time, since the contact angle between the tip portion 123A and the protruding portion 112 gradually decreases and becomes minimum when the rotation angle is 11.5°, the contact angle between the tip portion 123A and the sliding surface 111 rapidly changes and decreases. Therefore, since the magnitude of the restoring force by the coil spring 124 rapidly changes and becomes small, a clear operation sensation is generated from the tactile sensation generating mechanism. The operation sensation is transmitted to the hand of the operator who operates the operation portion 122.

When the rotation angle of the operation lever 120 becomes 10°, the other end portion 142 of the torsion spring 140 comes into contact with the locking portion 114 of the housing 110. Further, since the one end portion 141 of the torsion spring 140 is always in contact with the support portion 126 of the operation lever, when the rotation angle becomes greater than 10°, the torsion spring is deformed to apply a restoring force to the operation lever 120.

The magnitude of the restoring force of the operation lever 120 is related to the magnitude of the restoring force by the coil spring 124 and the magnitude of the restoring force by the torsion spring 140, and is adjusted so as to always maintain a positive value.

As described above, the magnitude of the restoring force by the coil spring 124 is a resultant force determined by a relational expression that uses a spring constant and a contraction amount of the coil spring 124, a contact angle between the tip portion 123A and the sliding surface 111, and the like as variables. Therefore, the magnitude of the restoring force of the operation lever 120 is determined by a relational expression that uses the restoring force of the coil spring 124, the restoring force of the torsion spring 140, the contact angle between the tip portion 123A and the sliding surface 111, and the like as variables.

Therefore, in a state where the rotation angle is 11.5°, the magnitude of the restoring force by the coil spring 124 is −2.1 [N], and the restoring force in the direction in which the rotation angle increases is applied to the operation lever, but the magnitude of the restoring force by the torsion spring 140 is 2.7 [N]. Therefore, in a state where the rotation angle is 11.5°, the total value of the magnitude of the restoring force by the coil spring 124 and the magnitude of the restoring force by the torsion spring 140 is 0.6 [N], which is a positive value. Further, in the angle range of the rotation angle from 0° to 25°, the magnitude of the restoring force by the coil spring 124 and the magnitude of the restoring force by the torsion spring 140 are adjusted such that the total value always maintains a positive value. Therefore, when the operator who operates the operation lever 120 releases the operation lever 120 after operating the operation lever 120 to a state where the rotation angle is 11.5°, the operation lever 120 rotates such that the rotation angle of the operation lever 140 returns to a state where the rotation angle is 10° due to the restoring force of the torsion spring 140. Further, after returning to the state where the rotation angle is 10°, the operation lever 120 rotates so as to return to the initial position where the rotation angle is 0° by the restoring force of the coil spring 124.

Figure 16:
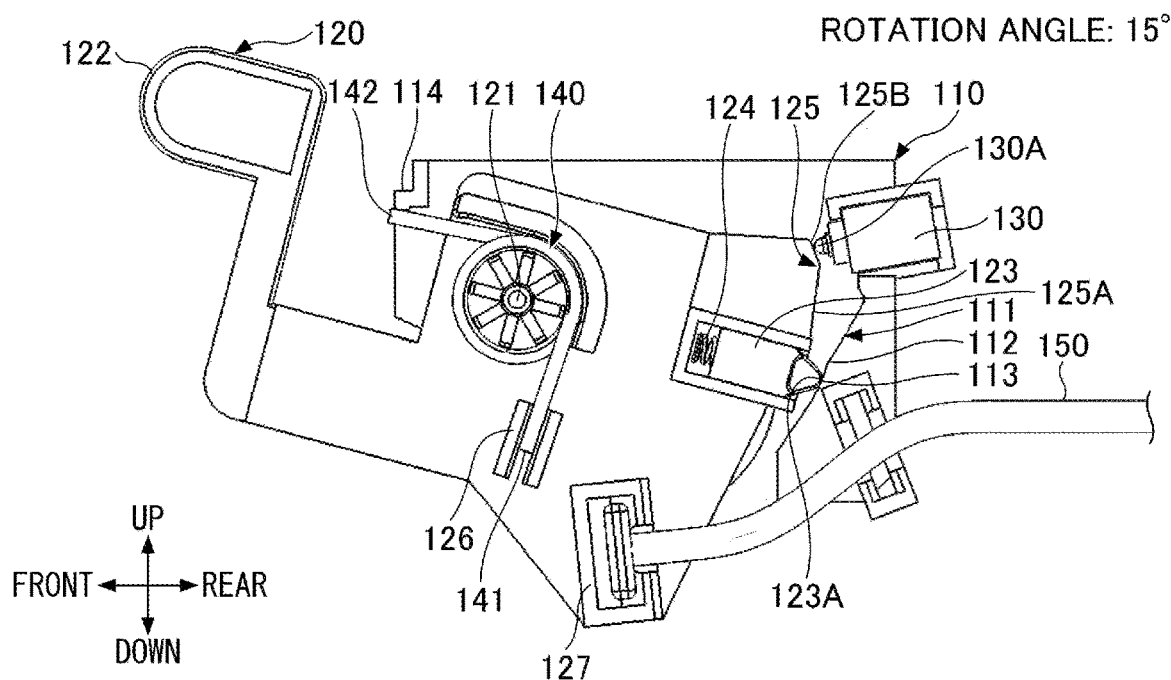
FIG. 16 is an explanatory view (9) of an operation of a door opener for a vehicle according to the present embodiment.
Figure 17:
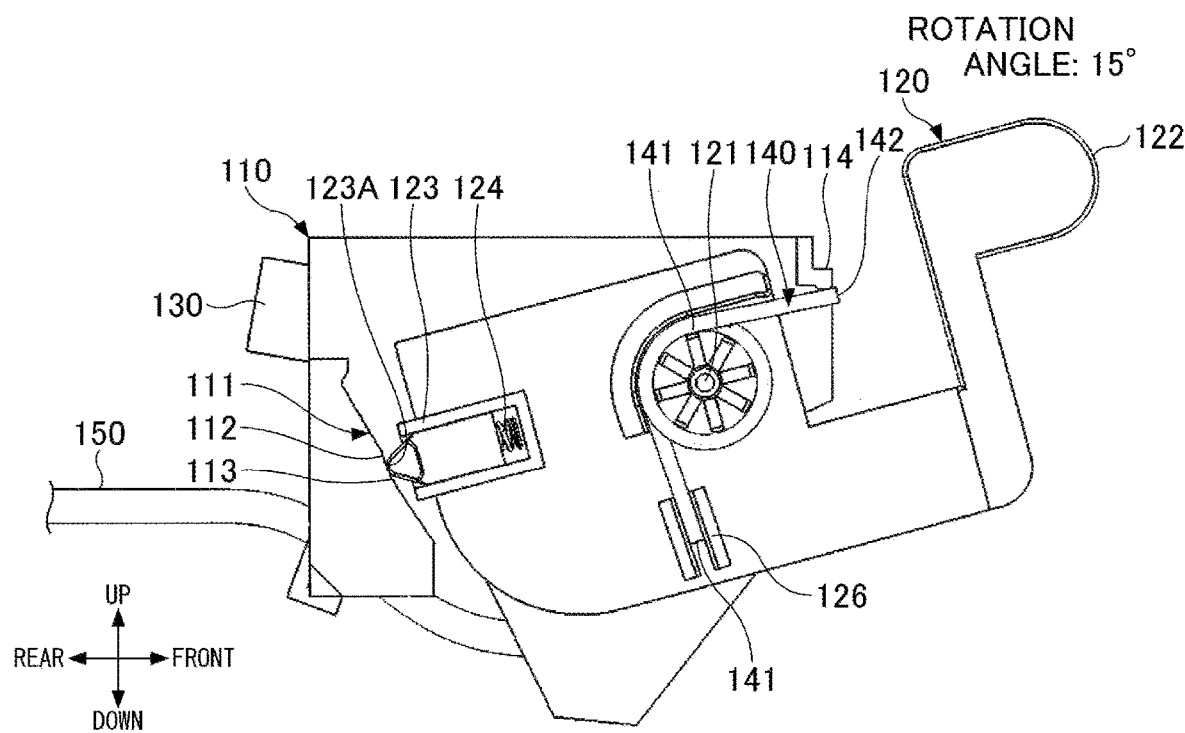
FIG. 17 is an explanatory view (10) of an operation of a door opener for a vehicle according to the present embodiment.

FIG. 16 and FIG. 17 illustrate a state where the operation lever 120 is further rotated around the rotation shaft 121 and the rotation angle of the operation lever 120 is 15°. FIG. 16 is a right side view and FIG. 17 is a left side view of this state. In this state, the force pressing the switch 130 attached to the housing 110 by the pressing portion 125 provided on the operation lever 120 is weakened, and the switch 130 is turned off. Since the other end portion 142 of the torsion spring 140 rotates while being in contact with the locking portion 114 of the housing 110, a restoring force is generated in the torsion spring 140. Therefore, when the hand is released from the operation lever 120 in this state, the operation lever 120 is rotated by the restoring force of the torsion spring 140 such that the rotation angle of the operation lever 120 returns to the state of 10°. Further, after the operation lever 120 returns to the state where the rotation angle is 10°, the operation lever 110 rotates so as to return to the original state where the rotation angle is 0° by the restoring force of the coil spring 124.

Figure 18:
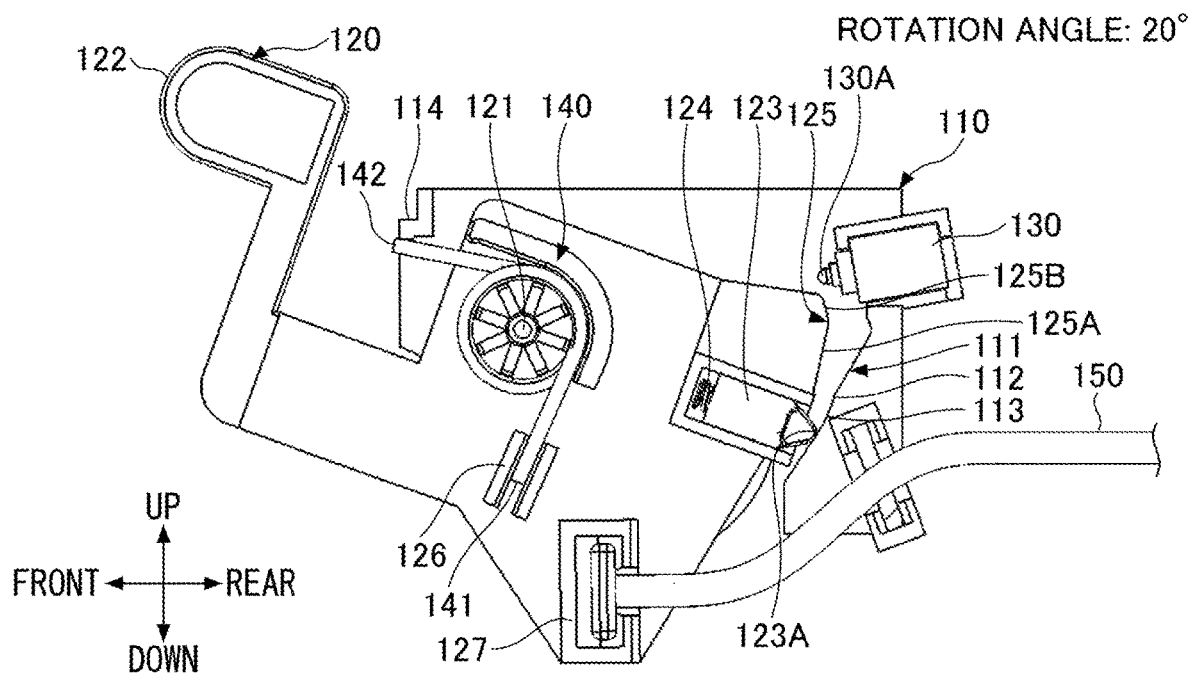
FIG. 18 is an explanatory view (11) of an operation of a door opener for a vehicle according to the present embodiment.
Figure 19:
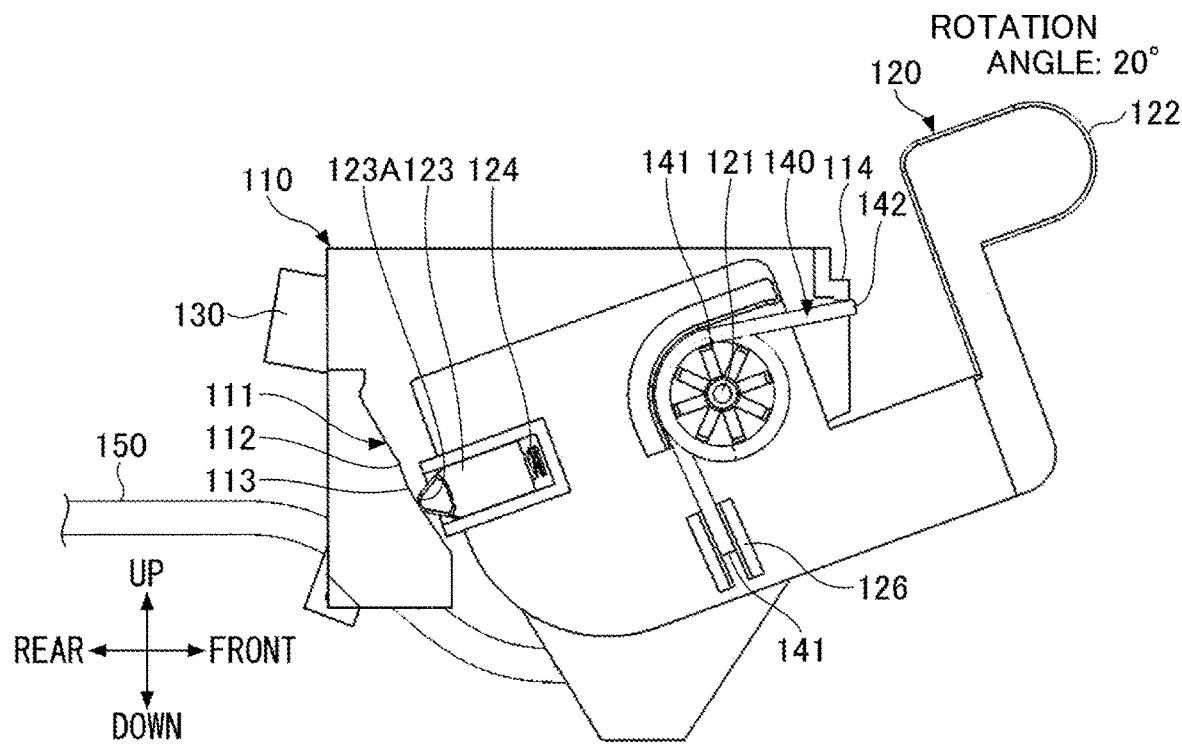
FIG. 19 is an explanatory view (12) of an operation of a door opener for a vehicle according to the present embodiment.

FIG. 18 and FIG. 19 illustrate a state where the operation lever 120 is further rotated around the rotation shaft 121 and the rotation angle of the operation lever 120 is 20°. FIG. 18 is a right side view and FIG. 19 is a left side view of this state. In this state, since the switch 130 attached to the housing 110 and the pressing portion 125 provided on the operation lever 120 are separated from each other, the switch 130 remains in OFF state. On the other hand, when the operation lever 120 rotates around the rotation shaft 121, the cable 150 is pulled, the mechanical switch 30 connected to the cable 150 is turned on, and a driving force for mechanically opening the door is generated, so that the door can be mechanically opened. Since the other end portion 142 of the torsion spring 140 rotates while being in contact with the locking portion 114 of the housing 110, a restoring force is generated in the torsion spring 140. Therefore, when the hand is released from the operation lever 120 in this state, the operation lever 120 is rotated by the restoring force of the torsion spring 140 such that the rotation angle of the operation lever 120 returns to the state of 10°. Further, after the operation lever 120 returns to the state where the rotation angle is 10°, the operation lever 110 rotates so as to return to the original state where the rotation angle is 0° by the restoring force of the coil spring 124.

Further, the sliding surface 111 is provided with a curved surface having a curvature in which the contact angle between the tip portion 123A and the sliding surface 111 gradually increases according to the rotation of the operation lever 120 when the operation lever 120 is operated in a direction in which the rotation angle changes from 11.5° to 20°. Further, the distance between the tip portion 123A and the rotation shaft 121 is gradually decreased, and the contraction amount of the coil spring 124 is gradually increased. Therefore, the magnitude of the restoring force by the coil spring 124 gradually increases according to the rotation of the operation lever 120, and increases from −2.1 [N] to −0.6 [N]. Further, in this angle range, the magnitude of the restoring force by the torsion spring 140 increases from 2.7 [N] to 8.4 [N] according to the rotation of the operation lever 120. Therefore, in this angle range, since the magnitude of the restoring force by the coil spring 124 and the magnitude of the restoring force by the torsion spring 140 increase at the same time, the operator who operates the operation portion 122 feels only a tendency that the restoring force increases.

Figure 20:
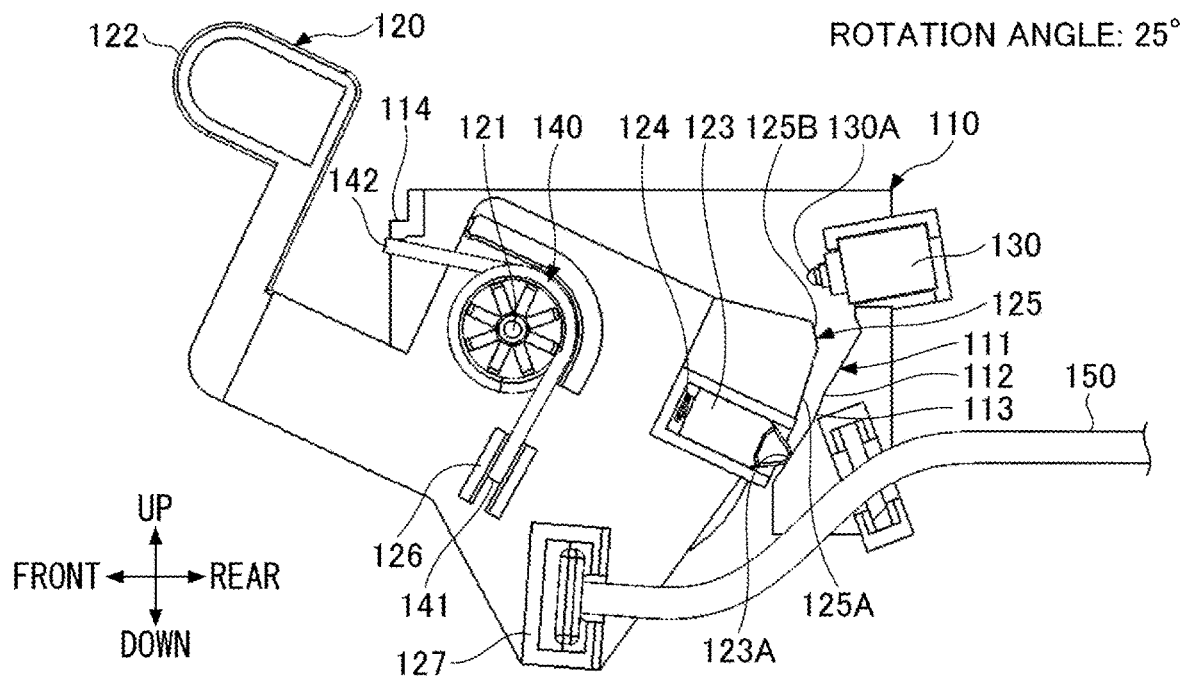
FIG. 20 is an explanatory view (13) of an operation of a door opener for a vehicle according to the present embodiment.
Figure 21:
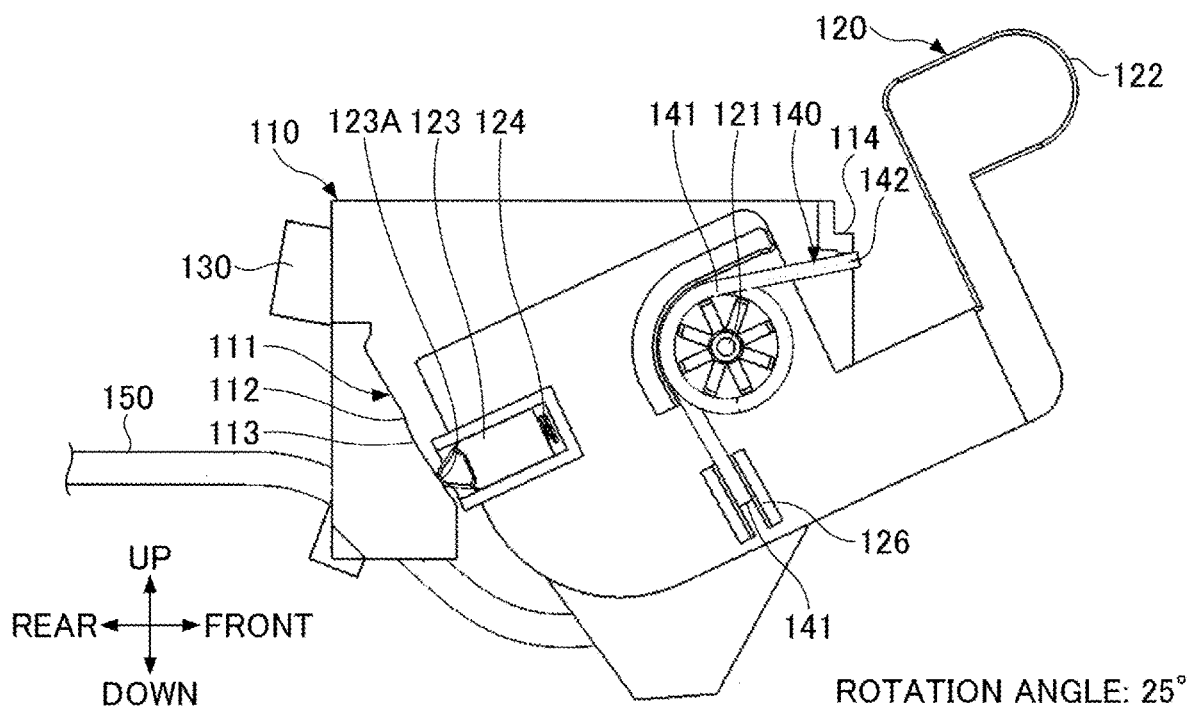
FIG. 21 is an explanatory view (14) of an operation of a door opener for a vehicle according to the present embodiment.

FIG. 20 and FIG. 21 illustrate a state where the operation lever 120 is further rotated around the rotation shaft 121 and the rotation angle of the operation lever 120 is 25°. In the present application, the position of the operation lever 120 at which the rotation angle is 25° may be referred to as a terminal position. FIG. 20 is a right side view and FIG. 21 is a left side view of this state. In this state, a part of the operation lever 120 (not illustrated) is in contact with a part of the housing 110 (not illustrated). Therefore, in this state, the operation lever 120 cannot rotate around the rotation shaft 121 any more, that is, a state where the rotation angle at which the operation lever 120 rotates around the rotation shaft 121 is maximum. In this state, since the switch 130 attached to the housing 110 and the pressing portion 125 provided on the operation lever 120 are separated from each other, the switch 130 is in OFF state. However, since the cable 150 is being pulled, the mechanical switch 30 is in ON state. Therefore, a driving force for mechanically opening the door 10 is generated, and the door 10 is mechanically opened. Since the other end portion 142 of the torsion spring 140 rotates while being in contact with the locking portion 114 of the housing 110, a restoring force is generated in the torsion spring 140. Therefore, when the hand is released from the operation lever 120 in this state, the operation lever 120 is rotated by the restoring force of the torsion spring 140 such that the rotation angle of the operation lever 120 returns to the state of 10°. Further, after the operation lever 120 returns to the state where the rotation angle is 10°, the operation lever 110 rotates so as to return to the original state where the rotation angle is 0° by the restoring force of the coil spring 124.

Further, the sliding surface 111 is provided with a curved surface having a curvature in which the contact angle between the tip portion 123A and the sliding surface 111 gradually decreases according to the rotation of the operation lever 120 when the operation lever 120 is operated in a direction in which the rotation angle changes from 20° to 25°. Therefore, since the magnitude of the restoring force by the coil spring 124 gradually decreases, an operation sensation is generated from the tactile sensation generating mechanism. The operation sensation is transmitted to the hand of the operator who operates the operation portion 122.

Next, with reference to FIG. 22, a force acting on the tip portion 123A of the protrusion member 123 will be described.

In the door opener for a vehicle according to the present embodiment, when the rotation angle obtained by rotating the operation lever 120 around the rotation shaft 121 is 0° or more and less than 10°, the switch 130 is not pressed by the pressing portion 125 provided on the operation lever 120 and is in OFF state. A portion of the sliding surface 111 that slides on the tip portion 123A of the protrusion member 123 at a rotation angle in a range of 0° or more and less than 10° is provided to have a curved surface having a curvature in which the distance from the rotation shaft 121 gradually decreases according to the rotation of the operation lever 120. Further, the portion is provided to have a curved surface having a curvature such that the magnitude of the restoring force by the coil spring 124 is a constant positive value. Therefore, the portion slides on the tip portion 123A of the protrusion member 123 to generate a slight restoring force, so that the operation lever 120 returns when released in a range of the rotation angle of 0° or more and less than 10°. Further, since the other end portion 142 of the torsion spring 140 provided as a movable end is not in contact with the locking portion 114 of the housing 110, a restoring force by the torsion spring 140 is not generated. Therefore, when the rotation angle of the operation lever 120 is in a range of 0° or more and less than 10°, the operator can operate the operation lever 120 with an extremely small operation force. In the present embodiment, such a range in which the rotation angle is 0° or more and less than 10° may be referred to as a first angle range.

Next, when the operation lever 120 is rotated around the rotation shaft 121 in a range of a rotation angle of 10° or more and 11.5° or less, the switch 130 is pressed by the pressing portion 125 provided on the operation lever 120 and is turned on.

Strictly speaking, there is also a restoring force generated when the pressing portion 130A of the switch 130 is pressed, but since the magnitude thereof is small and the contribution thereof to the restoring force of the operation lever 120 is small, the description thereof will be omitted for simplification.

When the rotation angle of the operation lever 120 is 10°, the top of the protruding portion 112 provided on the sliding surface 111 and the tip portion 123A of the protrusion member 123 are in contact with each other, but when the rotation angle becomes greater than 10°, the tip portion 123A slides to the recessed portion 113 provided adjacent to the protruding portion 112. Since the contact point changes from the top of the protruding portion 112 to the recessed portion 113, the contact angle between the tip portion 123A and the sliding surface 111 rapidly decreases, and the magnitude of the restoring force by the coil spring 124 also rapidly decreases. When the operation lever 120 is operated and the rotation angle is continuously rotated from 10° to 11.5°, the magnitude of the return force by the coil spring 124 decreases from 0.8 [N] to −2.1 [N]. Further, since the magnitude of the restoring force by the coil spring 124 becomes a negative value, a force in a direction in which the rotation angle increases is applied to the operation lever 120. Therefore, the operator who operates the operation lever 120 can clearly sense the change point of the feeling. By using the obtained change point of the operation sensation as a determination reference, a person operating the operation portion 122 of the operation lever 120 can determine that the switch 130 is turned ON.

Therefore, an accidental turning on of the mechanical switch can be prevented because the operator can determine to stop the rotation operation of the operation lever 120 based on the determination result. Further, in this state, since the torsion spring 140 rotates and elastically deforms in a state in which the one end portion 141 is in contact with the support portion 126 and the other end portion 142 is in contact with the locking portion 114, a restoring force is generated in the torsion spring 140. Therefore, when an operator releases the operation lever 120 after operating the operation lever 120 at an angle greater than 10°, the operation lever 120 returns to the state where the rotation angle is 10° due to the restoring force of the torsion spring 140. Further, the operation lever in the state where the rotation angle is 10° is returned to the state where the rotation angle is 0° by the restoring force of the coil spring 124. In the present disclosure, such a range in which the rotation angle is 10° or more and 11.5° or less may be referred to as a second angle range.

Next, the operation lever 120 is rotated around the rotation shaft 121 in a range in which the rotation angle is 11.5° or more and less than 20°, and the force pressing the switch 130 is weakened or eliminated by the pressing portion 125 provided on the operation lever 120, so that the switch is turned off. In the angle range in which the rotation angle of the operation lever 120 is 11.5° or more, an inclination of the portion of the sliding surface 111 that slides on the tip portion 123A of the protrusion member 123 is adjusted such that the restoring force of the coil spring 124 pressing the protrusion member 123 acts with a slight magnitude in the direction in which the rotation angle increases. Therefore, the operation sensation from the tactile sensation generating mechanism does not readily change. Further, the restoring force of the torsion spring 140 dominantly acts to generate a tactile sensation in the operation lever 120. Therefore, an operation sensation when the operation lever 120 is rotated in a range in which the rotation angle is 11.5° or more and is less than 20° is clearly different from an operation sensation when the operation lever 120 is rotated in a range in which the switch 130 is turned on. Therefore, when the rotation angle exceeds 11.5°, the operator who operates the operation lever 120 can determine that the switch 130 is out of ON state range by using the change in feeling as a determination reference. In the present disclosure, such a range in which the rotation angle is 11.5° or more and less than 20° may be referred to as a fourth angle range.

In a range in which the rotation angle of the operation lever 120 is 11.5° or more and less than 20°, the switch 130 is turned off, and the operation lever 120 rotates around the rotation shaft 121. Therefore, the cable 150 is pulled according to the rotation operation of the cable connection portion 127. However, the amount of tension is not sufficient to turn on the mechanical switch 30, and the mechanical switch 30 remains in OFF state. Even in this state, since the restoring force is generated in the torsion spring 140, when the hand is released from the operation lever 120, the operation lever 120 returns to the state where the rotation angle is 10° by the restoring force of the torsion spring 140. Further, in the angle range of the rotation angle from 10° to 25°, the magnitude of the restoring force by the torsion spring 140 is adjusted so as to be always greater than the magnitude of the restoring force by the coil spring 124. Therefore, the operation of the operation lever 120 is less likely to be hindered by the reaction force derived from the sliding surface 111 and the protrusion member 123. Further, the operation lever in the state where the rotation angle is 10° is returned to the state where the rotation angle is 0° by the restoring force of the coil spring 124.

Next, when the operation lever 120 is rotated around the rotation shaft 121 in a range of a rotation angle of 20° or more and 25° or less, the operation lever 120 is rotated around the rotation shaft 121, so that the cable 150 is pulled and the mechanical switch 30 is turned on. As a result, a driving force for mechanically opening the door is generated, and the door can be mechanically opened. In this state, the switch 130 is turned off. In a range in which the rotation angle of the operation lever 120 exceeds 20°, the inclination of the portion of the sliding surface 111 that slides on the tip portion 123A of the protrusion member 123 is adjusted such that the restoring force of the coil spring 124 is weaker than in a state where the rotation angle is 20°. Therefore, the force applied when the operation lever 120 is operated changes, that is, the feeling of the operation is changed, and the operation sensation is obtained. Further, since the restoring force is generated in the torsion spring 140, when the hand is released from the operation lever 120, the operation lever 120 returns to the state where the rotation angle is 10° by the restoring force of the torsion spring 140. Since the restoring force of the torsion spring 140 dominantly acts on the operation lever 120, the operation of the operation lever 120 is less likely to be hindered by the reaction force derived from the sliding surface 111 and the protrusion member 123. Further, the operation lever in the state of the rotation angle of 10° is returned to the state of the rotation angle of 0° by the restoring force of the coil spring 124. Such a range in which the rotation angle is 20° or more and 25° or less may be referred to as a third angle range.

As described above, in a door opener for a vehicle according to the present embodiment, the switch 130 and the mechanical switch 30 remain in OFF state in a range in which the rotation angle of the operation lever 120 is 0° or more and less than 10°, which is the first angle range. In the second angle range in which the rotation angle of the operation lever 120 is 10° or more and 11.5° or less, the switch 130 is turned on, but the mechanical switch 30 remains in OFF state. In this range, an operation sensation that the switch 130 is being turned on can be obtained. In the third angle range in which the rotation angle of the operation lever 120 is 20° or more and 25° or less, the switch 130 remains in OFF state, but the mechanical switch 30 is turned on.

In the fourth angle range between the second angle range and the third angle range, in which the rotation angle of the operation lever 120 is more than 11.5° and is less than 20°, the switch 130 and the mechanical switch 30 remain in OFF state.

In the present embodiment, the one end portion 141 of the torsion spring 140 is supported by the housing 110, and the other end portion 142 is not in contact with the operation lever 120 in the first angle range, but may be in contact with the operation lever 120 in the second angle range to the fourth angle range.

Although the embodiments have been described in detail above, the present disclosure is not limited to the specific embodiments, and various modifications and changes can be made within the scope described in the claims.

What is claimed is:

1. A door opener for a vehicle comprising:
   a housing;
   an operation lever attached to the housing rotatably around a rotation shaft between an initial position and a terminal position;
   a first switch configured to generate a control signal;
   a connector connected to a second switching device that mechanically opens a door of a vehicle;
   a tactile sensation generating mechanism; and
   a first elastic body that returns the operation lever,
   wherein, when a rotation angle of the operation lever is in a first angle range, the first switch is turned off and the second switching device does not transmit a driving force,
   wherein, when the rotation angle of the operation lever is in a second angle range of greater angles than in the first angle range, the first switch is turned on, a tactile sensation is generated by the tactile sensation generating mechanism, and the second switching device does not transmit the driving force, and
   wherein when the rotation angle of the operation lever is in a third angle range of greater angles than in the second angle range, the first switch is turned off and the second switching device transmits the driving force.

2. The door opener for a vehicle according to claim 1, wherein the tactile sensation generating mechanism includes a second elastic body that generates a tactile sensation according to a rotation of the operation lever, and, in the first angle range, returns the operation lever.

3. The door opener for a vehicle according to claim 1, wherein the first elastic body includes a fixed end portion and a movable end portion, and applies a restoring force to the operation lever.

4. The door opener for a vehicle according to claim 3, wherein the first elastic body applies the restoring force to the operation lever in the second angle range and the third angle range.

5. The door opener for a vehicle according to claim 1, wherein one end portion of the first elastic body is supported by the operation lever, and another end portion opposite from the one end portion is not in contact with the housing in the first angle range.

6. The door opener for a vehicle according to claim 3, wherein, in the second angle range and the third angle range, one end portion of the first elastic body is in contact with the operation lever, and the restoring force for returning the operation lever is generated in the first elastic body, or
   wherein, in the second angle range and the third angle range, another end portion opposite from the one end portion of the first elastic body is in contact with the housing, and the restoring force for returning the operation lever is generated in the first elastic body.

7. The door opener for a vehicle according to claim 2, wherein the tactile sensation generating mechanism includes:
   a sliding surface provided on the housing;
   the second elastic body; and
   a protrusion member that is attached to a side of the sliding surface of the operation lever so as to face the sliding surface, wherein the protrusion member comes into contact with the sliding surface by being pressed toward the side of the sliding surface due to a restoring force from the second elastic body, and slides on the sliding surface according to the rotation of the operation lever,
   wherein the sliding surface includes a protruding portion and a recessed portion, wherein the protruding portion is provided in a range where the protrusion member comes into contact with a tip portion of the protrusion member when the operation lever is rotated in the second angle range, and the recessed portion comes into contact with the protrusion member when the operation lever is rotated and switched from the second angle range to the third angle range.

8. The door opener for a vehicle according to claim 3, wherein the first elastic body is a torsion spring, one end portion of the torsion spring is fixed to the operation lever, and another end portion opposite from the one end portion of the torsion spring, when the operation lever rotates and moves from the first angle range to the second angle range, comes into contact with a locking portion provided on the housing.

9. The door opener for a vehicle according to claim 1, wherein, in a fourth angle range, the fourth angle range being between the second angle range and the third angle range, the first switch is turned off and the second switching device does not transmit the driving force.

10. The door opener for a vehicle according to claim 9, wherein a restoring force by the tactile sensation generating mechanism acts in a direction in which the rotation angle becomes wider in the third angle range and the fourth angle range.

11. The door opener for a vehicle according to claim 1, wherein the operation lever includes a pressing portion that is provided to face the first switch and is configured to change a distance from the first switch according to a rotation of the operation lever,
   wherein the pressing portion includes a first pressing surface that comes into contact with the first switch according to a rotation operation and a second pressing surface that is farther from the first switch than the first pressing surface, and the first pressing surface and the second pressing surface are formed continuously, and
   wherein the first pressing surface, when the operation lever is rotated in the second angle range, comes into contact with the first switch and presses the first switch to electrically turn on the first switch.

12. The door opener for a vehicle according to claim 1, wherein the connector is connected to the second switching device via a transmission member that transmits an operation force from an operator who operates the operation lever.

13. The door opener for a vehicle according to claim 12, wherein the connector is provided on the operation lever at a position spaced apart from the rotation axis of the operation lever, and the transmission member is moved by the connector being rotated together with a rotation of the operation lever, and the second switching device transmits the driving force according to the movement of the transmission member.

* * * * *